US012656765B2

(12) United States Patent
Parietti et al.

(10) Patent No.: US 12,656,765 B2
(45) Date of Patent: Jun. 16, 2026

(54) SYSTEMS AND METHODS FOR FACILITATING MODULAR AND PARALLELIZED MANUFACTURING AT A BIOLOGICAL FOUNDRY

(71) Applicant: Multiply Labs Inc., San Francisco, CA (US)

(72) Inventors: Federico Parietti, San Francisco, CA (US); Kameron C. Chan, San Francisco, CA (US); Alice Melocchi, Dalmine (IT); Jeffrey Ackerman Curhan, Warwick, RI (US); Michelle Chen, San Francisco, CA (US); Nolan Dickey, San Francisco, CA (US); Joaquin Giraldo-Laguna, San Francisco, CA (US); Roger Dean Lo, San Francisco, CA (US); Lawrence Zachary Bright, Palo Alto, CA (US)

(73) Assignee: Multiply Labs Inc., San Francisco, CA (US)

( * ) Notice: Subject to any disclaimer, the term of this patent is extended or adjusted under 35 U.S.C. 154(b) by 558 days.

(21) Appl. No.: 17/904,471

(22) PCT Filed: Feb. 19, 2021

(86) PCT No.: PCT/US2021/018927
§ 371 (c)(1),
(2) Date: Aug. 17, 2022

(87) PCT Pub. No.: WO2021/168368
PCT Pub. Date: Aug. 26, 2021

(65) Prior Publication Data
US 2023/0102750 A1      Mar. 30, 2023

Related U.S. Application Data

(60) Provisional application No. 62/978,723, filed on Feb. 19, 2020.

(51) Int. Cl.
*G05B 19/418* (2006.01)

(52) U.S. Cl.
CPC ................. *G05B 19/41865* (2013.01); *G05B 2219/32287* (2013.01); *G05B 2219/36542* (2013.01); *G05B 2219/40523* (2013.01)

(58) Field of Classification Search
None
See application file for complete search history.

(56) References Cited

U.S. PATENT DOCUMENTS

| | | | |
|---|---|---|---|
| 7,653,566 B2 * | 1/2010 | Kim | G06Q 10/06312 705/7.22 |
| 8,195,321 B2 * | 6/2012 | Mackelprang | G06Q 10/06 700/100 |

(Continued)

FOREIGN PATENT DOCUMENTS

WO      WO 2019/084315 A1      5/2019

OTHER PUBLICATIONS

International Search Report and Written Opinion for International Application No. PCT/US21/18927, mailed May 4, 2021.

*Primary Examiner* — Ariel Mercado-Vargas
(74) *Attorney, Agent, or Firm* — Morgan, Lewis & Bockius LLP

(57) ABSTRACT

Systems and methods for implementing one or more compiled workflows at a biological foundry are provided. A representation of an uncompiled workflow to produce engineering targets is obtained. The representation is translated into a first corresponding instance of a compiled workflow. If the translation satisfaction of various threshold translation criteria is determined, and the first corresponding instance of the compiled workflow is executed to complete a first portion of manufacture of the engineering targets. If the executing satisfaction of various threshold execution criteria is determined, the representation is translated into a second (Continued)

corresponding instance of the compiled workflow different from the first corresponding instance. If this translation satisfaction of the various threshold translation criteria is determined, the second corresponding instance of the compiled workflow is executed to complete a second portion of the manufacture of the engineering targets.

20 Claims, 16 Drawing Sheets

(56) References Cited

U.S. PATENT DOCUMENTS

| | | | | |
|---|---|---|---|---|
| 10,401,839 | B2 * | 9/2019 | Billi-Duran ...... | G05B 19/41865 |
| 12,117,800 | B2 * | 10/2024 | Chao .................. | G05B 19/4155 |
| 12,229,700 | B2 * | 2/2025 | Erramilli .............. | G06Q 10/063 |
| 2005/0209732 | A1 * | 9/2005 | Audimoolam ......... | G06Q 10/06 |
| | | | | 700/216 |
| 2009/0088875 | A1 * | 4/2009 | Baier ..................... | G06Q 10/06 |
| | | | | 700/83 |
| 2010/0123930 | A1 * | 5/2010 | Tomizawa ........... | G06F 3/1203 |
| | | | | 358/1.15 |
| 2016/0253321 | A1 | 9/2016 | Lee | |
| 2018/0158421 | A1 * | 6/2018 | Kadowaki .............. | G06Q 50/04 |
| 2018/0196918 | A1 | 7/2018 | Sadowski et al. | |
| 2019/0033819 | A1 | 1/2019 | Chao et al. | |
| 2019/0279126 | A1 * | 9/2019 | Erramilli ................ | G06Q 10/10 |
| 2020/0265353 | A1 * | 8/2020 | Srivastava ............. | G06F 30/23 |
| 2022/0137596 | A1 * | 5/2022 | Chao .................. | G05B 19/4155 |
| | | | | 700/28 |

* cited by examiner

100

300

400

*(402)*  A method of implementing one or more compiled workflows at a biological foundry. The biological foundry includes one or more processors, a memory storing one or more programs for execution by the one or more processors, a controller, a communications interface in electrical communication with at least a power supply and a plurality of peripheral devices. The plurality of peripheral devices including an articulated handling robot, such that the articulated handling robot is configured to advance the one or more compiled workflows from one or more instruments in a plurality of instruments at the biological foundry. Each respective instrument in the plurality of instruments is associated with a corresponding biological foundry operation in a plurality of biological foundry operations. The one or more programs singularly or collectively using the one or more processors to execute the method.

*(404)*  Obtaining, in electronic form, from a remote device, a representation of an uncompiled workflow that is configured to produce a first plurality of organic engineering targets at the biological foundry. The uncompiled workflow is associated with a plurality of workflow operations. Each workflow operation in the plurality of workflow operations being an operation in the plurality of biological foundry operations. Moreover, the plurality of workflow operations is temporally ordered.

*(406)*  Translating, via the controller, for each respective organic engineering target in the first plurality of organic engineering targets, the representation of the uncompiled workflow into a first corresponding instance of a compiled workflow for the respective organic engineering target in accordance with a plurality of heuristic constraints associated with the representation of the uncompiled workflow. The first corresponding instance of the compiled workflow includes, for each respective instrument in a subset of instruments of the plurality of instruments, a corresponding position in the temporal order of the plurality of workflow operations based on the corresponding biological foundry operation associated with the respective instrument, and one or more corresponding execution instructions comprising a corresponding first traverse instruction commanding the articulated handling robot to move to at least one corresponding spatial coordinate associated with the respective instrument.

*(408)*  Determining, via the controller, if the translating satisfies each threshold translation criterion in a plurality of threshold translation criteria associated with the translation of the uncompiled workflow. A first threshold translation criterion includes a performance score based on a comparison of the representation of the uncompiled workflow and the compiled workflow.

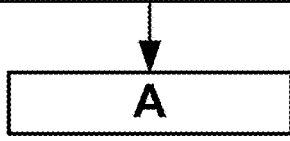

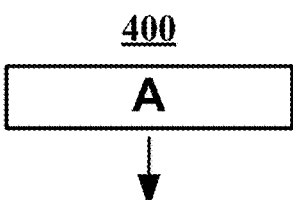

*(410)*   Executing, in accordance with a determination the translating satisfies each threshold translation criterion in the plurality of threshold translation criteria associated with the translation of the uncompiled workflow of the determining, the first corresponding instance of the compiled workflow, thus completing a first portion of the manufacture of the plurality of organic engineering targets.

*(412)*   Determining, via the controller, if a status of the executing satisfies each threshold execution criterion in a plurality of threshold execution criterion associated with the translation of the uncompiled workflow.  A first threshold execution criterion is associated with a disruption.

*(414)*   Translating, via the controller, for each respective organic engineering target in the first plurality of organic engineering targets, the representation of the uncompiled workflow into a second corresponding instance of the compiled workflow for the respective organic engineering target in accordance with the plurality of heuristic constraints associated with the representation of the uncompiled workflow.  The second corresponding instance of the compiled workflow includes, for a first instrument in the subset of instruments of the plurality of instructions, a second position other than a first position in the temporal order of the plurality of workflow operation of the first instrument in the first corresponding instance of the compiled workflow, and one or more execution instructions comprising a second traverse instruction commanding the articulated handling robot to move to at least one spatial coordinate associated with the first instrument when executing the second position in the temporal order of the plurality of workflow operation.

*(416)*   Determining, via the controller, if the translating satisfies each threshold translation criterion in the plurality of threshold translation criteria.

*(418)*   Executing, in accordance with a determination the translating satisfies each threshold translation criterion in the plurality of threshold translation criteria of the determining, the second corresponding instance of the compiled workflow, thus completing a second portion of the manufacture of the plurality of organic engineering targets.

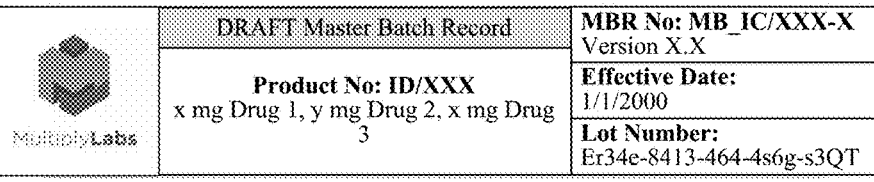

| | DRAFT Master Batch Record | MBR No: MB_IC/XXX-X Version X.X |
|---|---|---|
| | Product No: ID/XXX x mg Drug 1, y mg Drug 2, x mg Drug 3 | Effective Date: 1/1/2000 |
| | | Lot Number: Er34e-8413-464-4s6g-s3QT |

Transfer OA

| Opcode | Description | Value | Instrument ID | Time |
|---|---|---|---|---|
| 1.1 | Robot pick | 1 | Exsf-e-s32-716n... | 2000-1-1 13:48:01 |
| 1.2 | Robot scan | 360npc-776-e-... | Exsf-e-s32-716n... | 2000-1-1 13:48:03 |
| 1.3 | Robot place | 6 | Exsf-e-s32-716n... | 2000-1-1 13:48:12 |

Weighing O

| 9c4e36f2-5152-520e-b1ee-a079 | | | | |
|---|---|---|---|---|
| Capsule Well | Weight | Time of Pick (2.1) | Time of Wight (2.2) | Time of Place (2.3) |
| <Well F2> | 0 | 2000-1-1 13:48:27 | 2000-1-1 13:48:30 | 2000-1-1 13:48:37 |
| | | | | |

Transfer OB

| Opcode | Description | Value | Instrument ID | Time |
|---|---|---|---|---|
| 1.1 | Robot pick | | | |
| 1.2 | Robot scan | | | |
| 1.4 | Robot place & push | | | |

Filing 1

| Opcode | Description | Value | Instrument ID | Time |
|---|---|---|---|---|
| 3.1 | Issuance | | | |
| 3.2 | Deposition | | | |
| 3.3 | Remainder | | | |

Transfer 1A

| Opcode | Description | Value | Instrument ID | Time |
|---|---|---|---|---|
| 1.5 | Robot pull & pick | | | |
| 1.2 | Robot scan | | | |
| 1.3 | Robot place | | | |

Weighting 1

| Capsule Well | Weight | Time of Pick (2.1) | Time of Wight (2.2) | Time of Place (2.3) |
|---|---|---|---|---|
| | | | | |
| | | | | |
| | | | | |

Transfer 1B

| Opcode | Description | Value | Instrument ID | Time |
|---|---|---|---|---|
| 1 | Robot pick | | | |
| 1.2 | Robot scan | | | |
| 1.4 | Robot place & push | | | |

Filling 2

| Opcode | Description | Value | Instrument ID | Time |
|---|---|---|---|---|
| 3.1 | Issuance | | | |
| 3.2 | Deposition | | | |
| 3.3 | Remainder | | | |

Figure 7

SYSTEMS AND METHODS FOR FACILITATING MODULAR AND PARALLELIZED MANUFACTURING AT A BIOLOGICAL FOUNDRY

CROSS-REFERENCE TO RELATED APPLICATION

The present Application is a 371 United States National Phase Application of International Patent Cooperation Treaty Application No.: PCT/US2021/018927, entitled "Systems and Methods for Facilitating Modular and Parallelized Manufacturing at a Biological Foundry." filed Feb. 19, 2021, which claims priority to U.S. Provisional Patent Application No. 62/978,723, entitled "Modular and Parallelized Manufacturing Systems for Mass Customization and the Control Thereof." filed Feb. 19, 2020, each of which is hereby incorporated by reference in its entirety for all purposes.

TECHNICAL FIELD

The present disclosure generally relates to systems and methods for facilitating modular and parallelized manufacturing at a biological foundry. More particularly, the present disclosure relates to systems and methods designed to facilitate implementing one or more workflows at a biological foundry.

BACKGROUND

A large number of conventional solutions for manufacturing have been focused on: optimization of subsystems, greater and more precise and real-time data collection, and a greater level of automation and integration of advanced robotics technologies. Many of these innovations have taken the form of novel technologies in "Industry 4.0." predictive maintenance and analytics, advanced lean-focused optimizations (introduced with the advent of improved computation) and machine learning. See. Rüßmann et al., 2015. "Industry 4.0: The future of productivity and growth in manufacturing industries." Boston Consulting Group, 9(1), 54. However, the broad application of these technologies focuses on somewhat traditional systems.

For instance, much attention towards cloud-based software has been given in the manufacturing field. This kind of software approach ties in and enables many of the other above-mentioned innovations. Additionally, a lot of interest is growing as to how monitoring and analysis of manufacturing systems can be improved through the use of cloud software systems. The primary developments in the field have been towards big-data analytics, connected devices collecting data, and more powerful computation being available for the data science needed to make sense of the sensor output.

One non-limiting application of this factory architecture is pharmaceutical manufacturing. In this field, personalized therapies are becoming widespread, but traditional and existing manufacturing systems are not capable of mass-customization. Traditional systems as currently embodied consist of large scale tableting or capsule filling systems that can repeatably manufacture hundreds of thousands identical capsules. They are designed for one specific product at a time. Additionally, most of these systems require humans in the loop to monitor, regulate and complete material handling for these machines. Thus, a fully automated architecture capable of manufacturing personalized pharmaceutical products is a novel and necessary development in the field.

Given the above background, there is a need in the art for improved systems and methods for facilitating an improved in-store experience to address these dilemmas.

The information disclosed in this background section is only for enhancement of understanding of the general background of the invention and should not be taken as an acknowledgement or any form of suggestion that this information forms the prior art already known to a person skilled in the art.

SUMMARY

Advantageously, the systems and methods detailed in the present disclosure address the shortcomings in the prior art detailed above.

Systems and methods for broadly implement one or more workflows at a biological foundry by applies abstractions of architectures and designs of manufacturing systems to plan a sequence of manufacturing actions in the form of a representation of an uncompiled workflow; that, when translated into an instance of a corresponding compiled workflow, describes successful manufacture of the desired engineering targets.

Specifically, the systems and methods of the present disclosure directly apply to both manufacturing systems for small-batch, high-mix, personalized, or just-in-time production, and manufacturing systems where traditional serial mass production fail to address the shortcomings in the prior art detailed above.

One aspect of the present disclosure is directed to providing a modular, flexible and distributed manufacturing architecture and a supporting cloud architecture for manufacturing that may be applied broadly to a biological foundry. The biological foundry includes at least one manufacturing cluster associated with a corresponding biological foundry operation, also referred to herein as a "robotic cluster." which includes one or more instruments that perform the corresponding biological foundry operation. For instance, each robotic cluster of one or more instruments associated with the corresponding biological foundry operation includes at least one manufacturing instrument which performs some manufacturing step to produce a plurality of organic engineering targets at the biological foundry, and, optionally, a transport system, such as a convey system, that moves a portion of the manufacture of the plurality organic engineering targets, also referred to as a Work-In-Progress (WIP), between instruments in the one or more instruments of the biological foundry in a distributed and/or parallelized fashion. Each instrument is connected to a main control system (e.g., a controller and a communications interface) and to the other equipment via the controller at the biological foundry, and is given one or more execution instructions to perform work that products the plurality of organic engineering targets. In some embodiments, each instrument transmits out the data pertaining to the work a respective instrument performs for a corresponding workflow at the biological foundry. Each instrument is monitored locally at the biological foundry and by a remote device, such as a cloud server service. In some embodiments, a novel cloud-based computer system architecture and method is provided to monitor and deploy the one or more instructions at the biological foundry in a scalable manner. This cloud-based architecture of the present disclosure also ensures security and flexibility of the manufacturing system through the systems and methods described throughout the present disclosure.

One aspect of the present disclosure is directed to providing a pharmaceutical manufacturing foundry that provides a plurality of capsules for oral dosage, such as personalized capsules for a subject. This is provided without loss of generality. For instance, a portion of a manufacture including a tray of capsules is traversed from a first instrument to a second instrument by an articulated handling robot. Non-limiting examples of one or more instruments include a powder dispensing instrument that precisely doses one or more pharmaceutical formulations into the capsules, a capsule dispensing instrument that deposits precise counts of pre-formulated capsules, a capsule weighing instrument for in-process quality control, a spectroscopic material identification instrument for in-process quality control, a capsule assembly instrument for assembly multi-compartment capsules and closing capsules, a machine vision inspection instrument, a packaging instrument for bulk and/or singulated packaging, or a combination. However, the present disclosure is not so limited. The workflow, biological foundry operation, and instrument structures described herein enables biological foundries that are not limited to these above illustrative examples. By way of example, in a pharmaceutical manufacturing embodiment of a biological foundry, a single batch of manufacture of a plurality of engineering targets could be one patient prescription (e.g., a tray of capsules) and the hardware and software systems including the cloud-based systems is designed for Good Manufacturing Practice (GMP) compliance when producing the patient prescription manufacture. Accordingly, this pharmaceutical foundry manufactures personalized capsules and its scalability is leveraged to allow for dynamic changes in patient needs, novel clinical applications and in the development of new chemical entities and other novel pharmaceutical composition products.

Another aspect of the present disclosure is directed to providing a method of implementing one or more compiled workflows at a biological foundry. The biological foundry includes one or more processors, a memory storing one or more programs for execution by the one or more processors, a controller, a communications interface in electrical communication with at least a power supply and a plurality of peripheral devices. The plurality of peripheral devices including an articulated handling robot, such that the articulated handling robot is configured to advance the one or more compiled workflows from one or more instruments in a plurality of instruments at the biological foundry. Each respective instrument in the plurality of instruments is associated with a corresponding biological foundry operation in a plurality of biological foundry operations. The one or more programs singularly or collectively using the one or more processors to execute the method. The method includes obtaining, in electronic form, from a remote device, a representation of an uncompiled workflow that is configured to produce a first plurality of organic engineering targets at the biological foundry. The uncompiled workflow is associated with a plurality of workflow operations. Each workflow operation in the plurality of workflow operations being an operation in the plurality of biological foundry operations. Moreover, the plurality of workflow operations is temporally ordered. The method includes translating, via the controller, for each respective organic engineering target in the first plurality of organic engineering targets, the representation of the uncompiled workflow into a first corresponding instance of a compiled workflow for the respective organic engineering target in accordance with a plurality of heuristic constraints associated with the representation of the uncompiled workflow. The first corresponding instance of the compiled workflow includes, for each respective instrument in a subset of instruments of the plurality of instruments, a corresponding position in the temporal order of the plurality of workflow operations based on the corresponding biological foundry operation associated with the respective instrument, and one or more corresponding execution instructions comprising a corresponding first traverse instruction commanding the articulated handling robot to move to at least one corresponding spatial coordinate associated with the respective instrument. The method further includes determining, via the controller, if the translating satisfies each threshold translation criterion in a plurality of threshold translation criteria associated with the translation of the uncompiled workflow. A first threshold translation criterion includes a performance score based on a comparison of the representation of the uncompiled workflow and the compiled workflow. Moreover, the method includes executing, in accordance with a determination the translating satisfies each threshold translation criterion in the plurality of threshold translation criteria associated with the translation of the uncompiled workflow of the determining, the first corresponding instance of the compiled workflow, thus completing a first portion of the manufacture of the plurality of organic engineering targets. The method includes determining, via the controller, if a status of the executing satisfies each threshold execution criterion in a plurality of threshold execution criterion associated with the translation of the uncompiled workflow. A first threshold execution criterion is associated with a disruption. Additionally, the method includes translating, via the controller, for each respective organic engineering target in the first plurality of organic engineering targets, the representation of the uncompiled workflow into a second corresponding instance of the compiled workflow for the respective organic engineering target in accordance with the plurality of heuristic constraints associated with the representation of the uncompiled workflow. The second corresponding instance of the compiled workflow includes, for a first instrument in the subset of instruments of the plurality of instructions, a second position other than a first position in the temporal order of the plurality of workflow operation of the first instrument in the first corresponding instance of the compiled workflow, and one or more execution instructions comprising a second traverse instruction commanding the articulated handling robot to move to at least one spatial coordinate associated with the first instrument when executing the second position in the temporal order of the plurality of workflow operation. Accordingly, the method includes determining, via the controller, if the translating satisfies each threshold translation criterion in the plurality of threshold translation criteria. From this, the method includes executing, in accordance with a determination the translating satisfies each threshold translation criterion in the plurality of threshold translation criteria of the determining, the second corresponding instance of the compiled workflow, thus completing a second portion of the manufacture of the plurality of organic engineering targets.

In some embodiments, biological foundry further includes a transport path configured to accommodate the articulated handling robot.

In some embodiments, the plurality of instruments comprises a bioreactor, a centrifuge, an incubator, a liquid handling robot, a liquid chromatography system, a gas chromatography system, a mass spectrometry system, a microscope, a electrophoresis device, a electroporation device, a clone separation device, a clone selection device, a thermal cycler, a fume hood, a burner, a mill, a cooler, or a combination thereof.

In some embodiments, the plurality of biological foundry operations comprises a capsule deposition operation, a powder deposition operation, a buffer operation, a capsule assembly operation, a quality control operation, or a combination thereof.

In some embodiments, the plurality of biological foundry operations comprises a bioreactor operation, a centrifuge operation, a thawing operation, an enrichment operation, a freezing operation, an incubation operation, an activation operation, or a combination thereof.

In some embodiments, the plurality of workflow operations comprises a collection operation, a sort operation, an edit operation, a culture operation, a quality control operation, a formulate operation, or a combination thereof.

In some embodiments, the plurality of workflow operations are further spatially ordered, thereby forming a spatiotemporally ordered plurality of workflow operations.

In some embodiments, the plurality of heuristic constraints includes a first heuristic instruction that defines a non-human readable format of the compiled workflow.

In some embodiments, the plurality of workflow operations includes a plurality of series workflow operations.

In some embodiments, the plurality of workflow operations includes a plurality of parallel workflow operations.

In some embodiments, the performance score of the first threshold translation criterion comprises a precision of the translating, an accuracy of the translating, a limit of the translating, or a combination thereof.

In some embodiments, the first portion of the manufacture of the plurality of organic engineering targets is less than the second portion of the manufacture of the plurality of organic engineering targets.

In some embodiments, between the executing the first instance of the compiled workflow and the executing the second instance of the compiled workflow; the method completes the manufacture of the plurality of the engineering targets.

In some embodiments, the first traverse instruction is different from the second traverse instruction.

In some embodiments, the obtaining, the first translating, the first determining, the first executing, the second determining, the second translating, the third determining, the second executing, or a combination thereof is conducted without human interference.

In some embodiments, the plurality of heuristic constraints includes a privacy policy.

In some embodiments, the plurality of heuristic constraints includes an encryption policy.

In some embodiments, the plurality of heuristic constraints includes a manufacture recordation policy.

Yet another aspect of the present disclosure is directed to providing a computer system for implementing one or more compiled workflows at a biological foundry. The biological foundry includes one or more processors, a memory storing one or more programs for execution by the one or more processors, a controller, a communications interface in electrical communication with at least a power supply and a plurality of peripheral devices. The plurality of peripheral devices including an articulated handling robot, such that the articulated handling robot is configured to advance the one or more compiled workflows from one or more instruments in a plurality of instruments at the biological foundry. Each respective instrument in the plurality of instruments is associated with a corresponding biological foundry operation in a plurality of biological foundry operations. The one or more programs singularly or collectively using the one or more processors to execute the method. The method includes obtaining, in electronic form, from a remote device, a representation of an uncompiled workflow that is configured to produce a first plurality of organic engineering targets at the biological foundry. The uncompiled workflow is associated with a plurality of workflow operations. Each workflow operation in the plurality of workflow operations being an operation in the plurality of biological foundry operations. Moreover, the plurality of workflow operations is temporally ordered. The method includes translating, via the controller, for each respective organic engineering target in the first plurality of organic engineering targets, the representation of the uncompiled workflow into a first corresponding instance of a compiled workflow for the respective organic engineering target in accordance with a plurality of heuristic constraints associated with the representation of the uncompiled workflow. The first corresponding instance of the compiled workflow includes, for each respective instrument in a subset of instruments of the plurality of instruments, a corresponding position in the temporal order of the plurality of workflow operations based on the corresponding biological foundry operation associated with the respective instrument, and one or more corresponding execution instructions comprising a corresponding first traverse instruction commanding the articulated handling robot to move to at least one corresponding spatial coordinate associated with the respective instrument. The method further includes determining, via the controller, if the translating satisfies each threshold translation criterion in a plurality of threshold translation criteria associated with the translation of the uncompiled workflow. A first threshold translation criterion includes a performance score based on a comparison of the representation of the uncompiled workflow and the compiled workflow. Moreover, the method includes executing, in accordance with a determination the translating satisfies each threshold translation criterion in the plurality of threshold translation criteria associated with the translation of the uncompiled workflow of the determining, the first corresponding instance of the compiled workflow, thus completing a first portion of the manufacture of the plurality of organic engineering targets. The method includes determining, via the controller, if a status of the executing satisfies each threshold execution criterion in a plurality of threshold execution criterion associated with the translation of the uncompiled workflow. A first threshold execution criterion is associated with a disruption. Additionally, the method includes translating, via the controller, for each respective organic engineering target in the first plurality of organic engineering targets, the representation of the uncompiled workflow into a second corresponding instance of the compiled workflow for the respective organic engineering target in accordance with the plurality of heuristic constraints associated with the representation of the uncompiled workflow. The second corresponding instance of the compiled workflow includes, for a first instrument in the subset of instruments of the plurality of instructions, a second position other than a first position in the temporal order of the plurality of workflow operation of the first instrument in the first corresponding instance of the compiled workflow, and one or more execution instructions comprising a second traverse instruction commanding the articulated handling robot to move to at least one spatial coordinate associated with the first instrument when executing the second position in the temporal order of the plurality of workflow operation. Accordingly, the method includes determining, via the controller, if the translating satisfies each threshold translation criterion in the plurality of threshold translation criteria. From this, the method includes executing, in accordance with a determination the translating satisfies each threshold translation criterion in the plurality of threshold translation criteria of the determining, the second corresponding instance of the compiled workflow, thus completing a second portion of the manufacture of the plurality of organic engineering targets.

Yet another aspect of the present disclosure is directed to providing a non-transitory computer readable storage medium. The non-transitory computer readable storage medium stores one or more programs, the one or more programs include instructions, which when executed by a computer system at a biological foundry, perform a method.

In accordance with an aspect of the present disclosure, the above and other objects can be accomplished by the provision of a biological foundry workflow service, which provides mechanisms to improve facilitating implementation of one or more workflows at a biological foundry. The biological foundry includes one or more processors, a memory storing one or more programs for execution by the one or more processors, a controller, a communications interface in electrical communication with at least a power supply and a plurality of peripheral devices. The plurality of peripheral devices including an articulated handling robot, such that the articulated handling robot is configured to advance the one or more compiled workflows from one or more instruments in a plurality of instruments at the biological foundry. Each respective instrument in the plurality of instruments is associated with a corresponding biological foundry operation in a plurality of biological foundry operations. The one or more programs singularly or collectively using the one or more processors to execute the method. The method includes obtaining, in electronic form, from a remote device, a representation of an uncompiled workflow that is configured to produce a first plurality of organic engineering targets at the biological foundry. The uncompiled workflow is associated with a plurality of workflow operations. Each workflow operation in the plurality of workflow operations being an operation in the plurality of biological foundry operations. Moreover, the plurality of workflow operations is temporally ordered. The method includes translating, via the controller, for each respective organic engineering target in the first plurality of organic engineering targets, the representation of the uncompiled workflow into a first corresponding instance of a compiled workflow for the respective organic engineering target in accordance with a plurality of heuristic constraints associated with the representation of the uncompiled workflow. The first corresponding instance of the compiled workflow includes, for each respective instrument in a subset of instruments of the plurality of instruments, a corresponding position in the temporal order of the plurality of workflow operations based on the corresponding biological foundry operation associated with the respective instrument, and one or more corresponding execution instructions comprising a corresponding first traverse instruction commanding the articulated handling robot to move to at least one corresponding spatial coordinate associated with the respective instrument. The method further includes determining, via the controller, if the translating satisfies each threshold translation criterion in a plurality of threshold translation criteria associated with the translation of the uncompiled workflow. A first threshold translation criterion includes a performance score based on a comparison of the representation of the uncompiled workflow and the compiled workflow. Moreover, the method includes executing, in accordance with a determination the translating satisfies each threshold translation criterion in the plurality of threshold translation criteria associated with the translation of the uncompiled workflow of the determining, the first corresponding instance of the compiled workflow, thus completing a first portion of the manufacture of the plurality of organic engineering targets. The method includes determining, via the controller, if a status of the executing satisfies each threshold execution criterion in a plurality of threshold execution criterion associated with the translation of the uncompiled workflow. A first threshold execution criterion is associated with a disruption. Additionally, the method includes translating, via the controller, for each respective organic engineering target in the first plurality of organic engineering targets, the representation of the uncompiled workflow into a second corresponding instance of the compiled workflow for the respective organic engineering target in accordance with the plurality of heuristic constraints associated with the representation of the uncompiled workflow. The second corresponding instance of the compiled workflow includes, for a first instrument in the subset of instruments of the plurality of instructions, a second position other than a first position in the temporal order of the plurality of workflow operation of the first instrument in the first corresponding instance of the compiled workflow, and one or more execution instructions comprising a second traverse instruction commanding the articulated handling robot to move to at least one spatial coordinate associated with the first instrument when executing the second position in the temporal order of the plurality of workflow operation. Accordingly, the method includes determining, via the controller, if the translating satisfies each threshold translation criterion in the plurality of threshold translation criteria. From this, the method includes executing, in accordance with a determination the translating satisfies each threshold translation criterion in the plurality of threshold translation criteria of the determining, the second corresponding instance of the compiled workflow, thus completing a second portion of the manufacture of the plurality of organic engineering targets.

The methods and apparatuses of the present disclosure have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 4A and 4B collectively provide a flow chart of processes and features of a computer system for implementing one or more workflows at a biological foundry, in accordance with an embodiment of the present disclosure:

FIG. 7 illustrates a user interface for viewing a record of an instance of a compiled workflow at a biological foundry, in accordance with an embodiment of the present disclosure.

Figure 1:
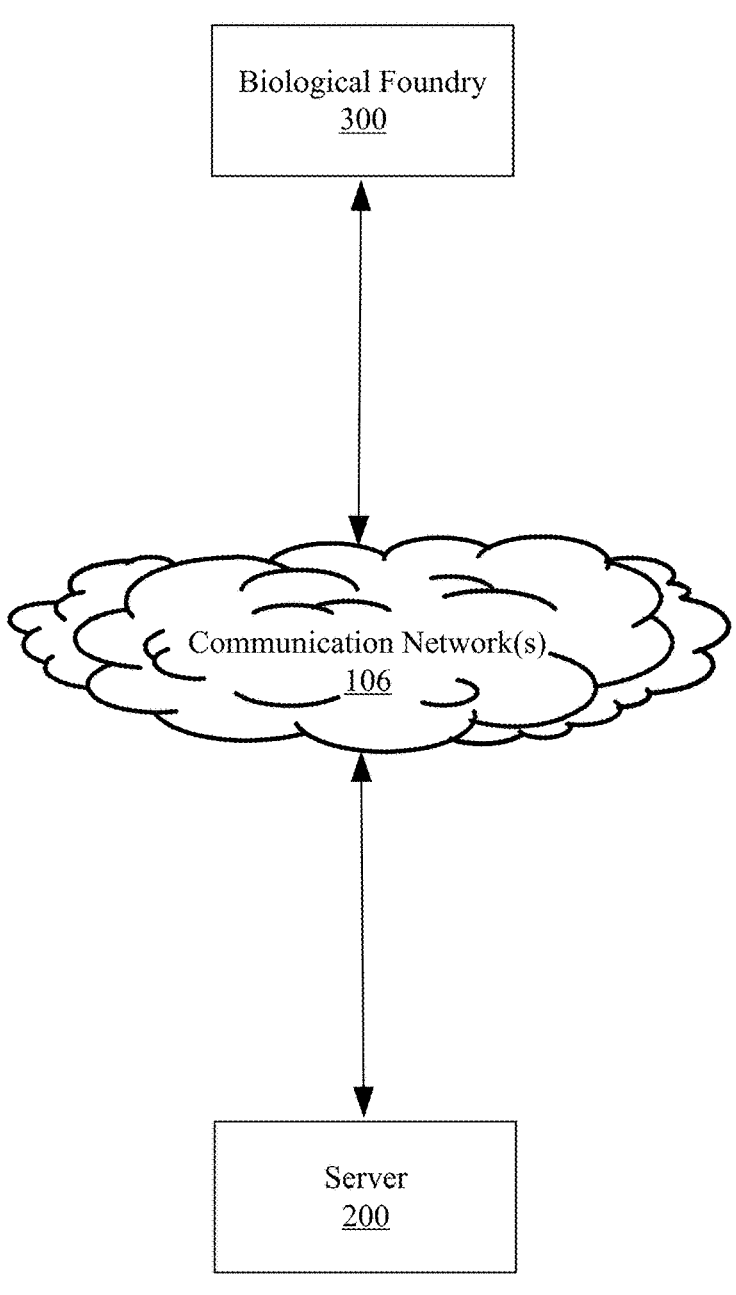
FIG. 1 illustrates an exemplary biological foundry workflow system topology including a server system and a computer system associated with a biological foundry, in accordance with an embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The present disclosure provides systems and methods for automated manufacturing of a plurality of organic engineering targets at a biological foundry. At the core of the system and methods of the present disclosure is a structure of a modular system including a plurality of instructions, with each respective instrument associated with a corresponding biological foundry operation of modules interconnected by an articulated handling robot, and, optionally, a transport path. Unlike conventional flexible manufacturing systems, the systems and methods of the present disclosure includes the plurality of instruments that is associated with a plurality of biological foundry operations, such that each respective instrument in the plurality of instruments is readily changed, updated, repaired, maintained, and the like for a different instruction of a respective biological foundry operation.

The presented disclosure provides a modular, flexible, and distributed systems and methods of implementing one or more workflows at a biological foundry to manufacture engineering targets at the biological foundry, and a supporting computer systems and methods for the manufacturing that may be applied as well to other fields, such as pharmaceutical composition manufacturing. The systems and methods of the present disclosure provide a variation and improvement for flexible manufacturing systems, in which biological foundry includes a plurality of instruments for manufacturing organic engineering targets that can be readily swapped in and out, scaled horizontally, and may be COTS systems or custom without additional variation or changes. These systems and methods of the present disclosure may be embodied, without loss of generality, as a temporal order of biological foundry operations that manufacture personalized engineering targets, such as pharmaceutical and/or cell therapies. Personalized medical products can be manufactured using GMP flexible robotic clusters including filling, weighing, assembling, spectroscopic scanning, and similar manufacturing modules which are controlled by a GMP cloud software infrastructure.

More particularly, the present disclosure provides systems and methods for implementing one or more compiled workflows at a biological foundry. A representation of an uncompiled workflow to produce engineering targets is obtained.

The representation is translated into a first corresponding instance of a compiled workflow. If the translation satisfaction of various threshold translation criteria is determined, and the first corresponding instance of the compiled workflow is executed to complete a first portion of manufacture of the engineering targets. If the executing satisfaction of various threshold execution criteria is determined, the representation is translated into a second corresponding instance of the compiled workflow different from the first corresponding instance. If this translation satisfaction of the various threshold translation criteria is determined, the second corresponding instance of the compiled workflow is executed to complete a second portion of the manufacture of the engineering targets.

Reference will now be made in detail to various embodiments of the present disclosure, examples of which are illustrated in the accompanying drawing and described below. While the disclosure will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the present invention as defined by the appended claims.

It will also be understood that, although the terms first, second, etc. may be used herein to describe various elements, these elements should not be limited by these terms. These terms are only used to distinguish one element from another. For example, a first instrument could be termed a second instrument, and, similarly, a second instrument could be termed a first instrument, without departing from the scope of the present disclosure. The first instrument and the second instrument are both instruments, but they are not the same instrument.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and or "comprising." when used in this specification, specify the presence of stated features, integers, steps, operations, elements, and or components, but do not preclude the presence or addition of one or more other features, integers, steps, operations, elements, components, and/or groups thereof.

As used herein, the term "if" may be construed to mean "when" or "upon" or "in response to determining" or "in response to detecting." depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Furthermore, when a reference number is given an "$i^{th}$" denotation, the reference number refers to a generic component, set, or embodiment. For instance, an application termed "application i" refers to the $i^{th}$ application in a plurality of applications.

The foregoing description included example systems, methods, techniques, instruction sequences, and computing machine program products that embody illustrative implementations. For purposes of explanation, numerous specific details are set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions below are not intended to be exhaustive or to limit the implementations to the precise forms disclosed. Many modifications and variations are possible in view of the above teachings. The implementations are chosen and described in order to best explain the principles and their practical applications, to thereby enable others skilled in the art to best utilize the implementations and various implementations with various modifications as are suited to the particular use contemplated.

In the interest of clarity, not all of the routine features of the implementations described herein are shown and described. It will be appreciated that, in the development of any such actual implementation, numerous implementation-specific decisions are made in order to achieve the designer's specific goals, such as compliance with use case- and business-related constraints, and that these specific goals will vary from one implementation to another and from one designer to another. Moreover, it will be appreciated that such a design effort might be complex and time-consuming, but nevertheless be a routine undertaking of engineering for those of ordering skill in the art having the benefit of the present disclosure.

An aspect of the present disclosure is directed to providing an implementation of one or more workflows at a biological foundry service, particularly for the facilitation of manufacturing a plurality of organic engineering targets at a biological foundry.

In some embodiments, a computer implemented method operating at a device is provided. The device includes a display, an objective lens, and a two-dimensional pixelated detector in communication with the objective lens. The device further includes one or more processors, and memory storing one or more programs for execution by the one or more processors. The one or more programs includes instructions for receiving a selection of a first product in a plurality of products. The selection of the first product is based on an evaluation of an image captured by the two-dimensional pixelated detector. From this, the first product is placed in a bin of one or more products associated with a corresponding client identifier in a plurality of client identifiers. The computer implemented method includes receiving a command to purchase each product in the one or more products of the bin. Additionally, the computer implemented method includes communicating, to a server, in response to the receiving the command, a request to purchase each product in the one or more products of the bin. The request includes a corresponding location identifier associated with a physical address of the one or more products. The request further includes a corresponding stock unit identifier for each product in the one or more products. Furthermore, the request includes a transaction identifier of the request to purchase each product in the one or more products. In addition, the computer implemented method includes receiving, in response to the request, an authorization of the request to purchase each product in the one or more products. From this, an authorization for purchase of the first product at the device is provided.

Figure 2:
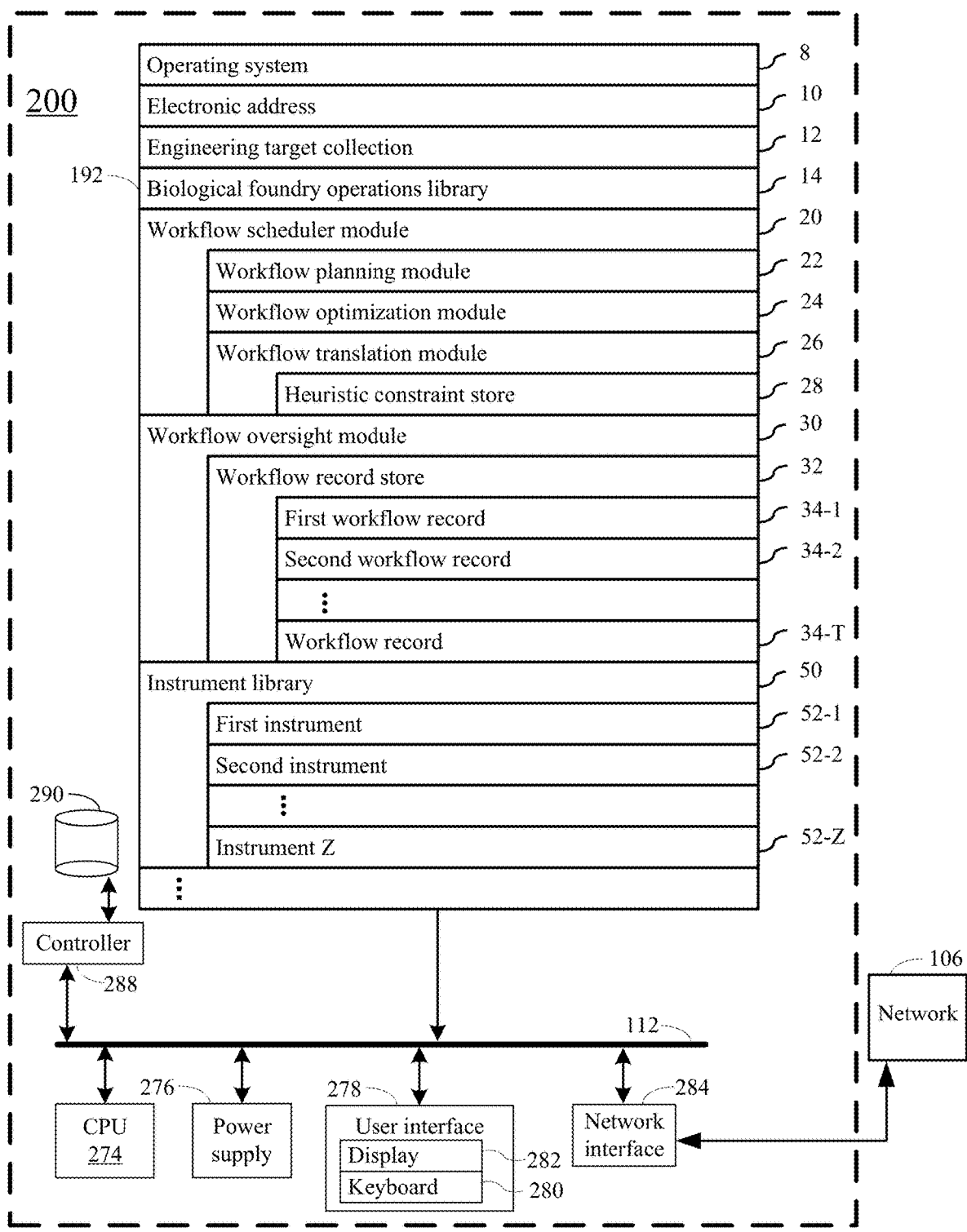
FIG. 2 illustrates various modules and/or components of a server system, in accordance with an exemplary embodiment of the present disclosure.
Figure 3A:
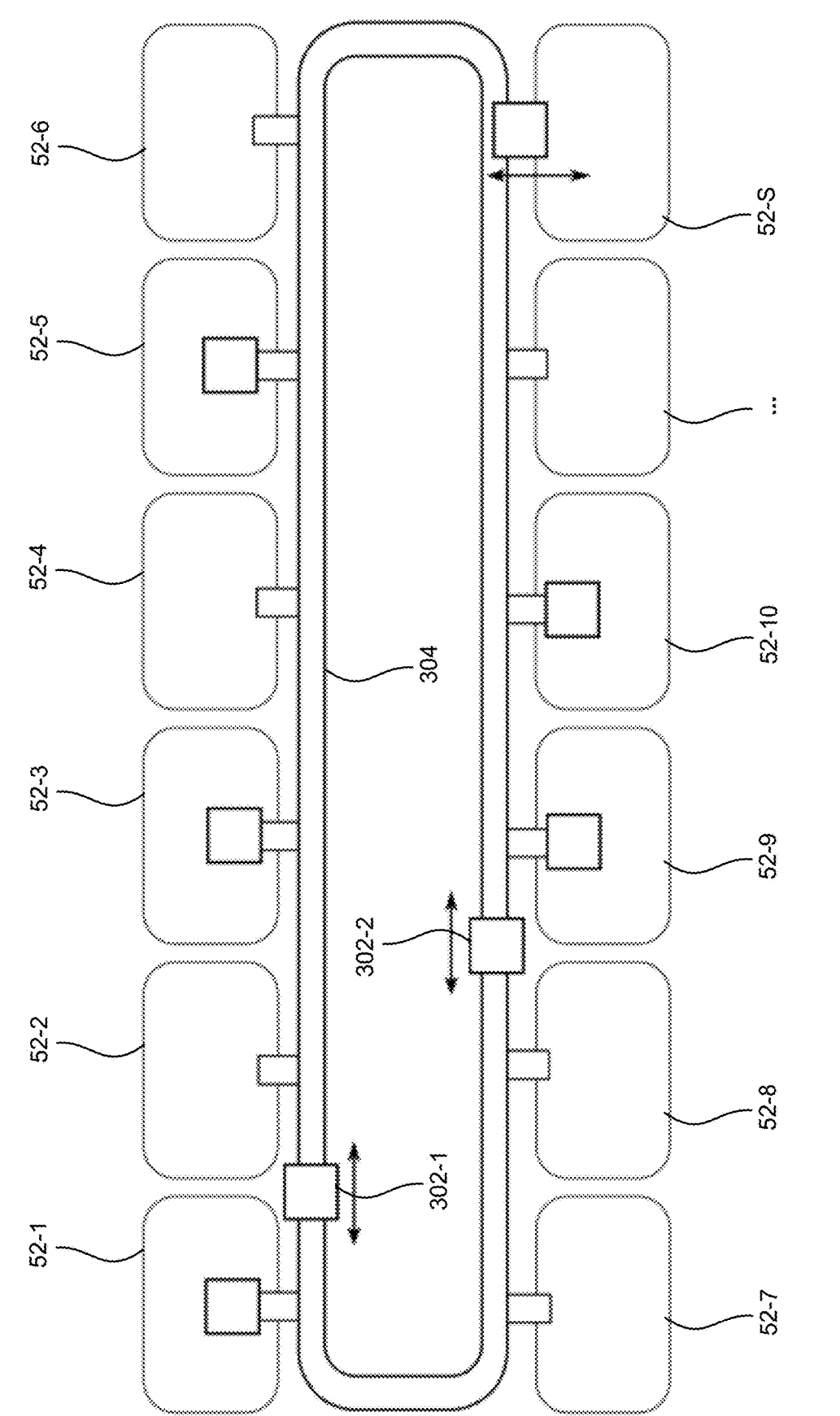
FIG. 3A illustrates a portion of biological foundry, in accordance with an embodiment of the present disclosure.
Figure 3B:
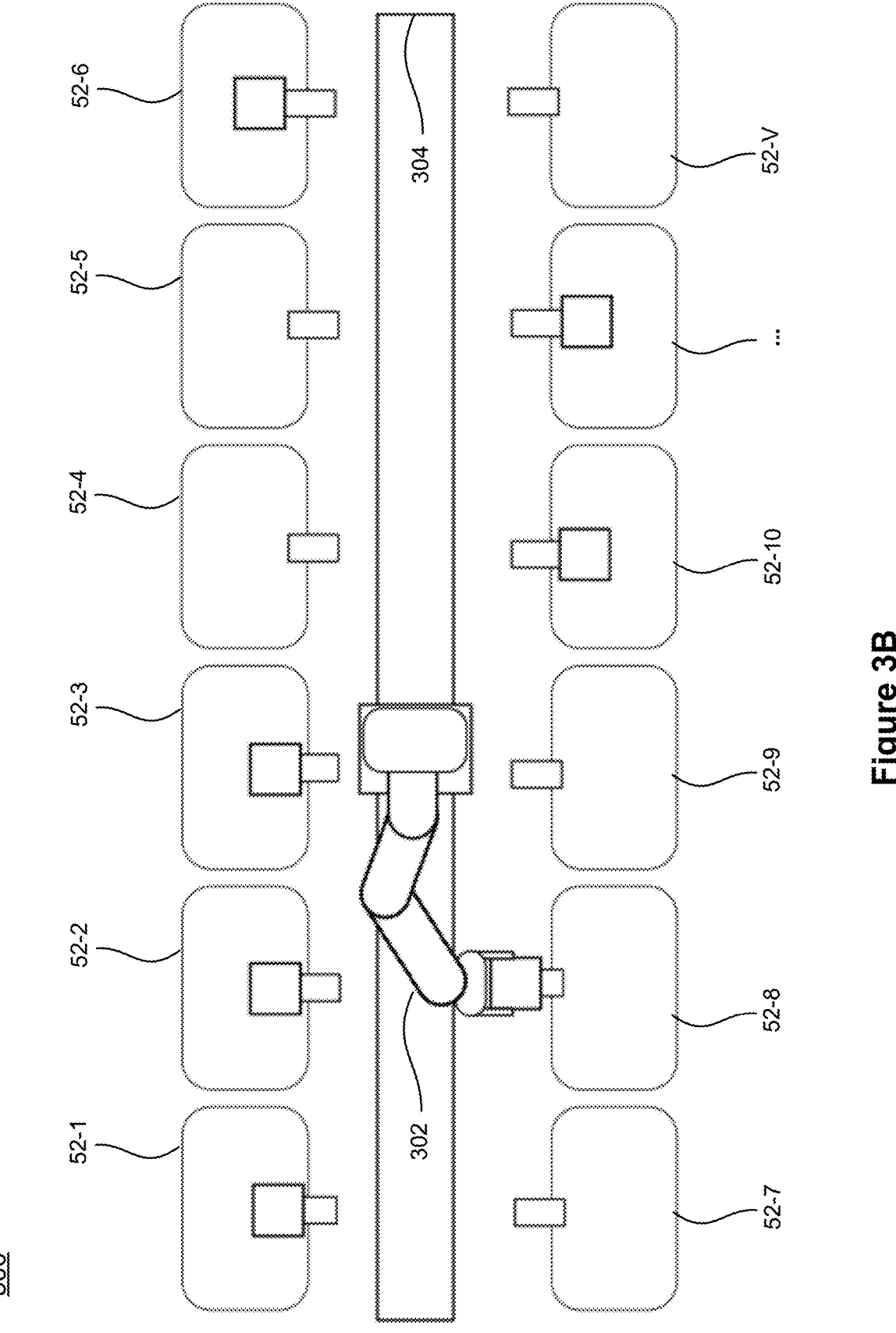
FIG. 3B illustrates a portion of another biological foundry, in accordance with an embodiment of the present disclosure.

FIG. 1 illustrates an exemplary topography of a system 100 for implementing one or more workflows (e.g., first instance of compiled workflow 500-1 of FIG. 5, second instance of compiled workflow 500-2 of FIG. 5) at a biological foundry (e.g., biological foundry 300 of FIG. 3B). The system 100 includes a server 200 that facilitates generating a representation of an uncompiled workflow and providing scheduling (e.g., workflow scheduling module 20 of FIG. 2) and oversight (e.g., workflow oversight module 30 of FIG. 2), and the biological foundry 300. The biological foundry 300 communicates with the server 200 through a communications network 106, such as communicating a request for the representation of the uncompiled workflow and/or a result of executing a corresponding instance of a compiled workflow translated from the representation.

A detailed description of a system 100 for implementing one or more workflows at a biological foundry 300 in accordance with the present disclosure is described in conjunction with FIG. 1 through FIG. 3B. As such, FIG. 1 through FIG. 3B collectively illustrate an exemplary topology of the system 100 in accordance with the present disclosure. In the topology, there is a server 200 for generating a representation of an uncompiled workflow that produces a plurality of organic engineering targets, and providing scheduling of a plurality of instruments (e.g., instruments 52 of FIG. 5) in correlation with a corresponding plurality of biological foundry operations (e.g., workflow scheduling module 20 of FIG. 2), and oversight of the manufacture of the plurality of organic engineering targets (e.g., workflow oversight module 30 of FIG. 2).

Referring to FIG. 1, the server 200 is configured to store a collection of engineering targets (e.g., engineering target collection 12 of FIG. 2), a library of a plurality of biological foundry operations (e.g., biological foundry operations library 14 of FIG. 2), and an instrument library describing a plurality of instruments 52 of a respective biological foundry 300. In some embodiments, the server 200 includes a scheduler module (e.g., workflow schedule module 20 of FIG. 2) for generating a representation of an uncompiled workflow and an oversight module (e.g., workflow oversight module 30 of FIG. 2) for providing oversight (e.g., compliance oversight, policy oversight, etc.) for an instance of a corresponding compiled workflow translated from the representation of the uncompiled workflow.

In some embodiments, the server 200 receives the data elements wirelessly through radio-frequency (RF) signals. In some embodiments, such signals are in accordance with an 802.11 (Wi-Fi), BLUETOOTH, or ZIGBEE standard.

In some embodiments, the server 200 is not proximate to the biological foundry 300 and/or does not have wireless capabilities or such wireless capabilities are not used for the purpose of providing the representation of the uncompiled workflow to the biological foundry 300. In such embodiments, a communication network 106 is utilized to communicate an update for executing a respective instance of a corresponding compiled workflow from the service to the biological foundry. In some embodiments, the communication network 106 is utilized to communicate a result of a manufacture of a respective organic engineering target produced at the biological foundry 300 to the server 200.

Examples of communication networks 106 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a. IEEE 802.11ac. IEEE 802.11ax. IEEE 802.11b, IEEE 802.11g and/or IEEE 802.11n), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of the present disclosure.

Of course, other topologies of the system 100 other than the one depicted in FIG. 1 are possible. For instance, in some embodiments, rather than relying on a communications network 106, the server 200 wirelessly transmits information directly to the biological foundry 300. Further, in some embodiments, the server 200 constitutes a portable electronic device, a server computer, or in fact constitute several computers that are linked together in a network, or are instantiated as one or virtual machines and/or containers in a cloud-computing context. As such, the exemplary topology shown in FIG. 1 merely serves to describe the features of an embodiment of the present disclosure in a manner that will be readily understood to one of skill in the art.

Turning to FIG. 2 with the foregoing in mind, in some embodiments, the server 200 includes one or more computers. For purposes of illustration in FIG. 2, server 200 is represented as a single computer that includes all of the functionality for implementing one or more workflows at a biological foundry 300. However, the present disclosure is not limited thereto. In some embodiments, the functionality for providing a server 200 is spread across any number of networked computers, and/or resides on each of several networked computers, and/or is hosted on one or more virtual machines and/or one or more containers at a remote location accessible across the communications network 106. One of skill in the art will appreciate that any of a wide array of different computer topologies are used for the application and all such topologies are within the scope of the present disclosure.

An exemplary server 200 for implementing one or more workflows at the biological foundry 300 is provided. The server 200 includes one or more processing units (CPU's) 274, a network or other communications interface 284, a memory 192 (e.g., random access memory), one or more magnetic disk storage and or persistent devices 290 optionally accessed by one or more controllers 288, one or more communication busses 112 for interconnecting the aforementioned components, a user interface 278, the user interface 278 including a display 282 and input 280 (e.g., keyboard, keypad, touch screen), and a power supply 276 for powering the aforementioned components. In some embodiments, a plurality of data elements in memory 192 are seamlessly shared with non-volatile memory 290 using known computing techniques such as caching. In some embodiments, the memory 192 and/or memory 290 includes mass storage that is remotely located with respect to the central processing unit(s) 274. In other words, some data stored in the memory 192 and/or memory 290 may in fact be hosted on computers that are external to the server 200 but that can be electronically accessed by the server 200 over an Internet, intranet, or other form of network or electronic cable (illustrated as element 106 in FIG. 2A) using network interface 284.

In some embodiments, the memory 192 of the server 200 for implementing one or more workflows at the biological foundry includes:

instructions, programs, data, or information associated with an operating system 8 (e.g., IOS, ANDROID, DARWIN, RTXC, LINUX, OS X, WINDOWS, or an embedded operating system such as VxWorks), which includes various software components and/or drivers for controlling and managing general system tasks (e.g., memory management, storage device control, power management, etc.) and facilitates communication between various hardware and software components;

an electronic address 10 associated with the server 200;

an engineering target collection 10 storing a plurality of engineering targets (e.g., biological engineering targets, pharmaceutical engineering targets) for production at a biological foundry;

a biological foundry operations library storing a plurality of biological foundry operations conducted at a biological foundry 300;

a workflow schedule 20 including a workflow planning module 22, a workflow optimization module 24, and a workflow translation module 26 including a heuristic constraint store 28;

a workflow oversight module 30 including a workflow record store 32 storing a plurality of workflow records 34; and an instrument library 50 storing a record of a plurality of instruments 52 found at a biological foundry 300.

An electronic address 10 is associated with the server 200, which is utilized to at least uniquely identify the server 200 and the biological foundry 300 from other devices and components of the system 100. Similarly, in some embodiments, the electronic address associated with the server or the biological foundry 300 includes a serial number, and optionally, a model number or manufacturer information that further identifies the biological foundry 300, or, similarly, an instrument at the biological foundry 300. In some embodiments, the electronic address 304 associated with the client device 300 is used to provide a source of a data received from and/or provided to the client device 300.

In some embodiments, data elements (e.g., workflow scheduler module 20, workflow oversight module 30, biological foundry operations library 14, etc.) can be stored in any form of data storage system including, but not limited to, a flat file, a relational database (SQL), or an on-line analytical processing (OLAP) database (MDX and/or variants thereof). In some embodiments, as associated data is stored in a single database. In other embodiments, as well as associated data is stored in a plurality of databases that may or may not all be hosted by the same server 200. In such embodiments, some components as well as associated data are stored on computer systems that are not illustrated by FIG. 1 but that are addressable by the communications network 106.

In some embodiments, one or more of the above identified data stores and/or modules of the server 200 are stored in one or more of the previously described memory devices (e.g., memory 192 and/or memory 290), and correspond to a set of instructions for performing a function described above. The above-identified data, modules, or programs (e.g., sets of instructions) need not be implemented as separate software programs, procedures, or modules. Thus, various subsets of these modules may be combined or otherwise re-arranged in various implementations. In some implementations, the memory 192 and/or memory 290 optionally stores a subset of the modules and data structures identified above. Furthermore, in some embodiments the memory 192 and/or memory 290 stores additional modules and data structures not described above.

Referring to FIGS. 3A and 3B, a description of a biological foundry 300 that can be used with the presently disclosure is provided. The biological foundry 300 includes one or more processors, a memory storing one or more programs for execution by the one or more processors. The biological foundry further includes a controller, a communications interface in electrical communication with at least a power supply. In some embodiments, the power supply 358 optionally includes a power management system, one or more power sources (e.g., one or more batteries, alternating current (AC)), a recharging system, a power failure detection circuit, a power converter or inverter, a power status indicator (e.g., a light-emitting diode (LED)) and any other components associated with the generation, management, and distribution of power in portable devices.

Additionally, the biological foundry 300 includes a plurality of peripheral devices including an articulated handling robot (e.g., articulated handling robot 302 of FIG. 3B). The articulated handling robot 302 is configured to advance the one or more compiled workflows from between one or more instruments 52 in a plurality of instruments 52 at the biological foundry (e.g., between a first instrument 52-1 and a fifth instrument 52-5 of the biological foundry 300). However, one of skill in the art will appreciate that the present disclosure is not so limited.

In some embodiments, the biological foundry 300 optionally also includes one or more optical sensors to allow for visual inspection of a respective instrument 52. The optical sensor(s) optionally include charge-coupled device (CCD) or complementary metal-oxide semiconductor (CMOS) phototransistors. The optical sensor(s) optionally capture still images and or video, such as an image of a first organic engineering target manufactured at the biological foundry 300.

In the interest of brevity and clarity, only a few of the possible components of the client device 300 are shown to better emphasize the additional software modules that are installed on the client device.

Now that details of a system 100 for implementing one or more workflows at a biological foundry 300 have been disclosed, details regarding a flow chart of processes and features for implementing a method 400 for facilitating implementing one or more workflows at the biological foundry 300, in accordance with an embodiment of the present disclosure, are disclosed with reference to FIGS. 4A and 4B.

Block 402. Referring to block 402 of FIG. 4A, a method (e.g., method 400 of FIGS. 4A and 4B) of implementing one or more compiled workflows at a biological foundry 300 is provided. The biological foundry 300 includes one or more processors, a memory storing one or more programs for execution by the one or more processors, a controller (e.g., control system of FIG. 6), a communications interface in electrical communication with at least a power supply and a plurality of peripheral devices.

Figure 5A:
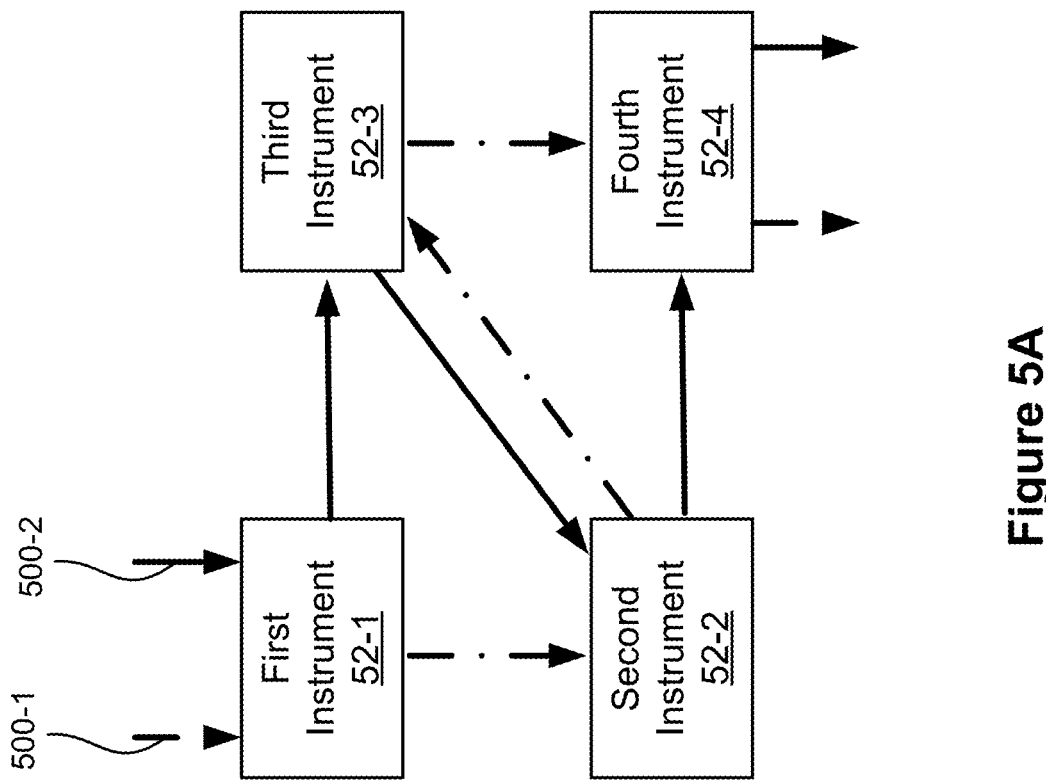
FIGS. 5A, 5B, 5C, 5D, 5E, 5F, 5G, and 5H collectively illustrate flows of one or more workflows at a biological foundry, in accordance with an embodiment of the present disclosure.
Figure 5B:
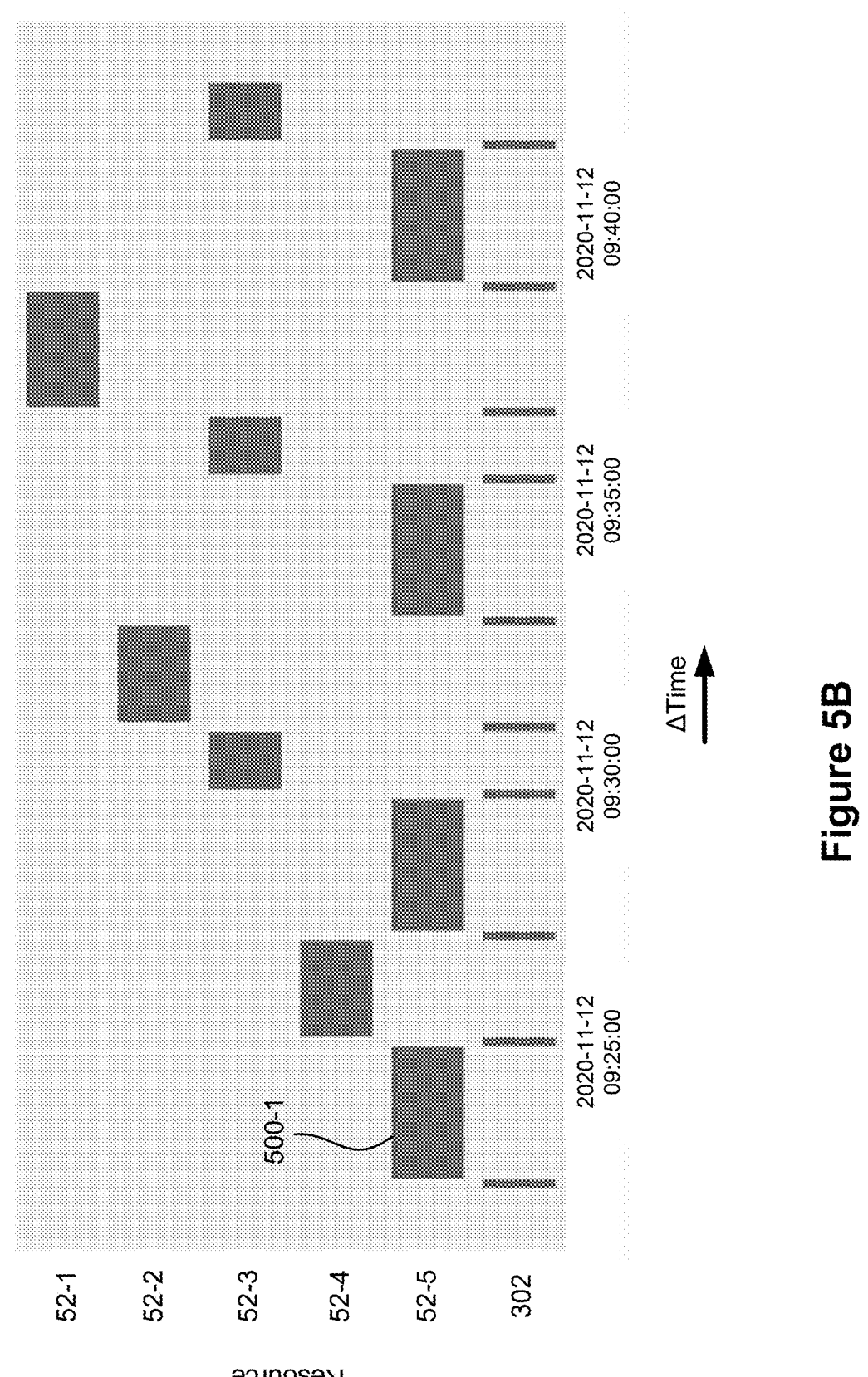
Figure 5C:
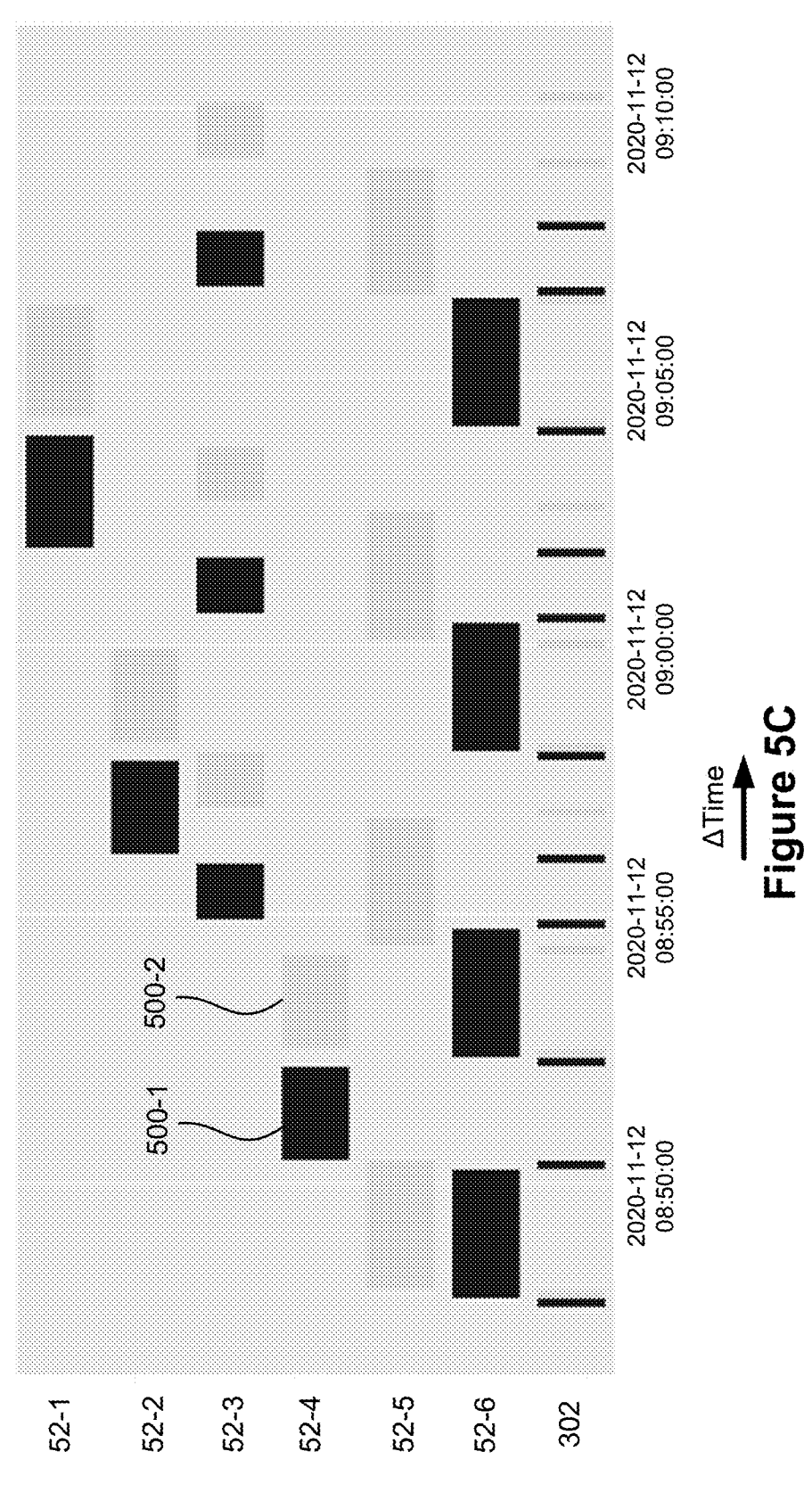

The plurality of peripheral devices include an articulated handling robot (e.g., articulated handling robot 302 of FIG. 3A, articulated handling robot 302 of FIG. 5B, etc.) In this way, the articulated handling robot 302 is configured to advance the one or more compiled workflows from one or more instruments (e.g., instruments 52 of FIG. 3A, instruments 52 of FIG. 3B, instruments 52 of FIG. 5A, instruments 52 of FIG. 5B, instruments 52 of FIG. 5C, instruments 52 of FIG. 5D, instruments 52 of FIG. 5E, instruments 52 of FIG. 5F, etc.) in a plurality of instruments 52 at the biological foundry 300.

In some embodiments, biological foundry 300 further includes a transport path (e.g., transport path 304 of FIG. 3A) configured to accommodate the articulated handling robot 302. However, the present disclosure is not limited. In some embodiments, the articulated handling robot 300 includes a selective compliance assembly robot arm (SCARA). In some embodiments, the articulated handling robot 300 is the previously described transport path 304. In some embodiments, the articulated handling robot 300 includes a conveyer belt, a linear transfer stage, a gantry, an elevator, or a combination. One of skill in the art will appreciate that the present disclosure is not so limited. For instance, in some embodiments, the articulated handling robot includes a four axis arm, a five axis arm, or a six axis arm. However, one of skill in the art will appreciate that the present disclosure allow for other mechanism other than an articulated handling robot, such as a random access mechanism. In some embodiments, the random access mechanism includes a gantry, a robotic arm, a conveyor, and the like. One of skill the art will appreciate other random access mechanism within the domain of the systems and methods of the present disclosure.

Each respective instrument 52 in the plurality of instruments 52 is associated with a corresponding biological foundry operation 16 in a plurality of biological foundry operations 16. The one or more programs singularly or collectively using the one or more processors to execute the method 400.

Block 404. Referring to block 404, the method includes obtaining, in electronic form, from a remote device (e.g., server 200 of FIG. 2, server 200 of FIG. 6), a representation of an uncompiled workflow that is configured to produce a first plurality of organic engineering targets at the biological foundry. The uncompiled workflow is associated with a plurality of workflow operations. Each workflow operation in the plurality of workflow operations being an operation in the plurality of biological foundry operations. Moreover, the plurality of workflow operations is temporally ordered.

Block 406. Referring to block 406, the method includes translating, via the controller, for each respective organic engineering target in the first plurality of organic engineering targets, the representation of the uncompiled workflow into a first corresponding instance of a compiled workflow for the respective organic engineering target in accordance with a plurality of heuristic constraints associated with the representation of the uncompiled workflow:

In some embodiments, each organic engineering target in the first plurality of organic engineering targets is an assembly of nucleic acid components. For instance, in some embodiments, each organic engineering target in the first plurality of organic engineering targets is a plasmid, and the nucleic acid components are predetermined promoters, repressors, stop codon, and exons. In some embodiments, each organic engineering target in the first plurality of organic engineering targets is a different predetermined nucleic acid with a different predetermined nucleic acid sequence. In some embodiments, each organic engineering target in the first plurality of organic engineering targets is a different predetermined ribonucleic acid (mRNA) with a different predetermined nucleic acid sequence. In some embodiments, each organic engineering target in the first plurality of organic engineering targets is a different predetermined deoxyribonucleic acid (DNA) with a different predetermined nucleic acid sequence. In some embodiments, each organic engineering target in the first plurality of organic engineering targets is a different predetermined polymer. In some embodiments, each organic engineering target in the first plurality of organic engineering targets is a different predetermined peptide. In some embodiments, each organic engineering target in the first plurality of organic engineering targets is a different predetermined protein.

As such, in the context of biological foundries 300, an organic engineering target is one of the objectives of a research and development project that defines the desired biological trait to be achieved. The organic engineering target can be either quantitative or qualitative. For example, in one embodiment, an organic engineering target(s) can be a genetic configuration for a biosynthetic pathway that produces more compound of interest than a current level. In another embodiment, the organic engineering target(s) is a genetic configuration for a microbial host that has a tolerance to an inhibitor over X mg/L. Additionally, in some embodiments an organic engineering target is a polynucleotide or nucleic acid sequence.

The first corresponding instance of the compiled workflow includes, for each respective instrument 52 in a subset of instruments 52 of the plurality of instruments 52, a corresponding position in the temporal order of the plurality of workflow operations. For instance, in some embodiments, a first instrument 52 is associated with a first terminus position in the temporal order and a second instrument 52 second terminus position in the temporal order of the plurality of workflow operations. However, the present disclosure is not so limited. In some embodiments, the corresponding position in the temporal order of workflow operations is based on the corresponding biological foundry operation 16 associated with the respective instrument 52. In some embodiments, a first operation 16 is configured as a first terminus operation 16 and/or a second operation is configured as a second terminus operation 16.

In some embodiments, the corresponding position in the temporal order of workflow operations is based on one or more corresponding execution instructions for a respective instrument 52. In some embodiments, the one or more corresponding execution instructions include a corresponding first traverse instruction that commands the articulated handling robot 302 to move to at least one corresponding spatial coordinate associated with the respective instrument 52. In some embodiments, the corresponding first traverse instruction further commands the articulated handling robot 302 to advance a portion of the manufacture of the plurality of engineering targets from the respective instrument 52 to a second instrument other than the respective 52.

Block 408. Referring to block 408, in some embodiments, the method 400 further includes determining, via the controller, if the translating of the representation of the uncompiled workflow into a corresponding instance of the compiled workflow at the biological foundry 300 satisfies each threshold translation criterion in a plurality of threshold translation criteria. In some embodiments, the plurality of threshold translation criteria is defined by the workflow oversight module 30 and/or the workflow scheduler module 20 of the server 200. In some embodiments, the plurality of threshold translation criteria is associated with the translation of the uncompiled workflow. In some embodiments, a first threshold translation criterion includes a performance score based on a comparison of the representation of the uncompiled workflow and the compiled workflow. In some embodiments, the performance score is a precision of the translation, an accuracy of the translation, a limit of the translation, or the like. For instance, consider a desired portion of a manufacturing of a first organic target in a plurality of organic targets is 10.00 mg of a compound A, a representation of an uncompiled workflow producing the first organic target produces 10.00 mg, a corresponding instance of an compiled workflow producing the first organic target produces 10.06 mg, and a threshold translation criterion requires 1% accuracy, such that the corresponding instance of the compiled workflow and the representation of the uncompiled workflow both satisfy the threshold translation criterion.

Block 410. Referring to block 410 of FIG. 5B, in some embodiments, the method 400 includes executing, in accordance with a determination the translating satisfies each threshold translation criterion in the plurality of threshold translation criteria associated with the translation of the uncompiled workflow of the determining, the first corresponding instance of the compiled workflow, thus completing a first portion of the manufacture of the plurality of organic engineering targets. In some embodiments, first portion of the manufacture is a terminus portion of the manufacture of the plurality of organic engineering targets. However, the present disclosure is not limited thereto.

Block 412. Referring to block 412, in some embodiments, the method 400 includes determining, via the controller, if a status of the executing of the corresponding instance of the compiled workflow at the biological foundry 300 satisfies each threshold execution criterion in a plurality of threshold execution criterion associated with the translation of the uncompiled workflow. A first threshold execution criterion is associated with a disruption. In some embodiments, the disruption is at the server 200. In some embodiments, the disruption is at the biological foundry. By way of example, in some embodiments, a reservoir associated with a respective instrument 52 requires additional raw materials, such that the respective instrument is transiently removed from the biological foundry, and thus unavailable for producing a portion of the manufacture of the plurality of engineering targets.

Figure 5D:
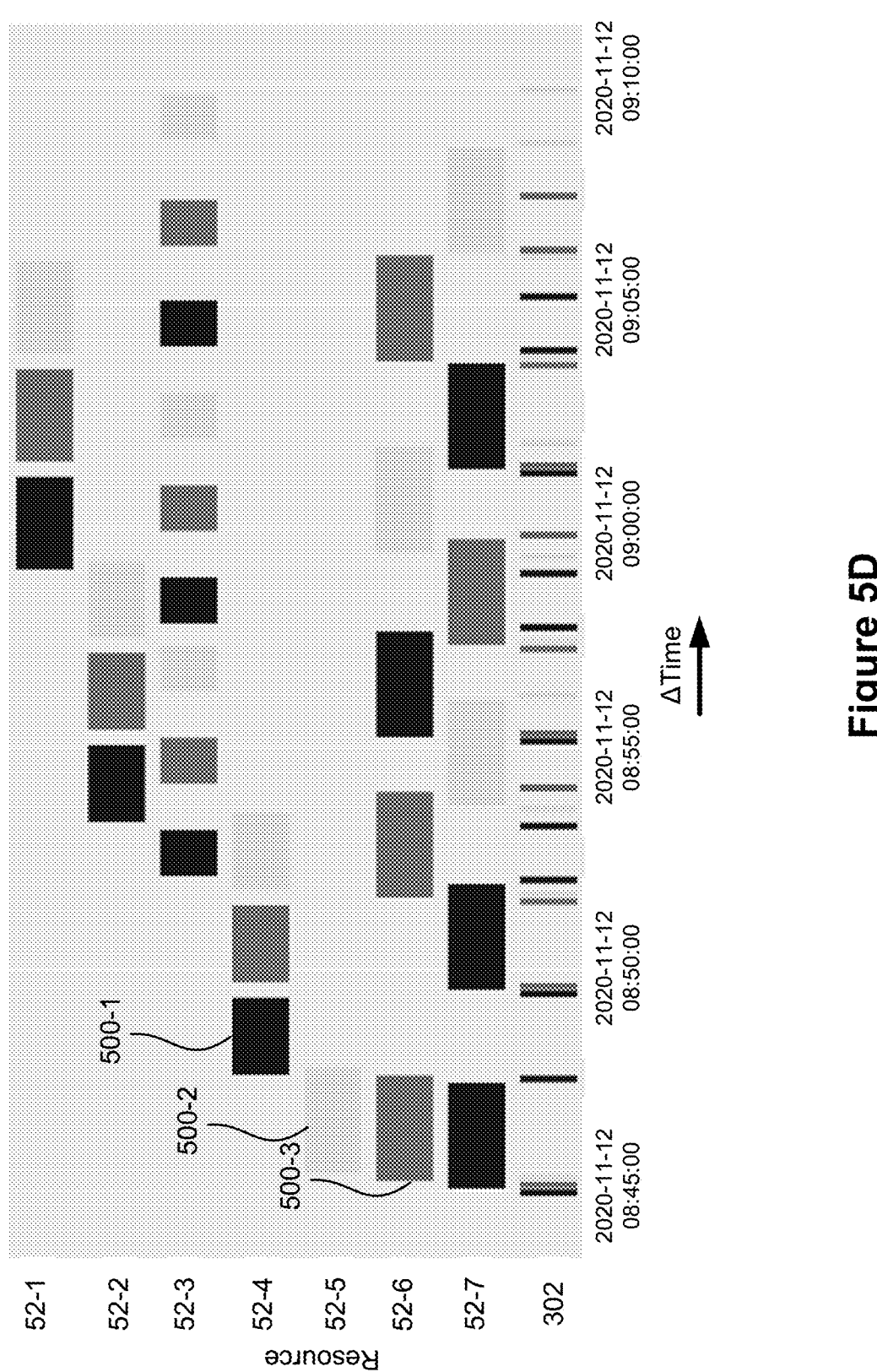
Figure 5E:
Figure 5F:
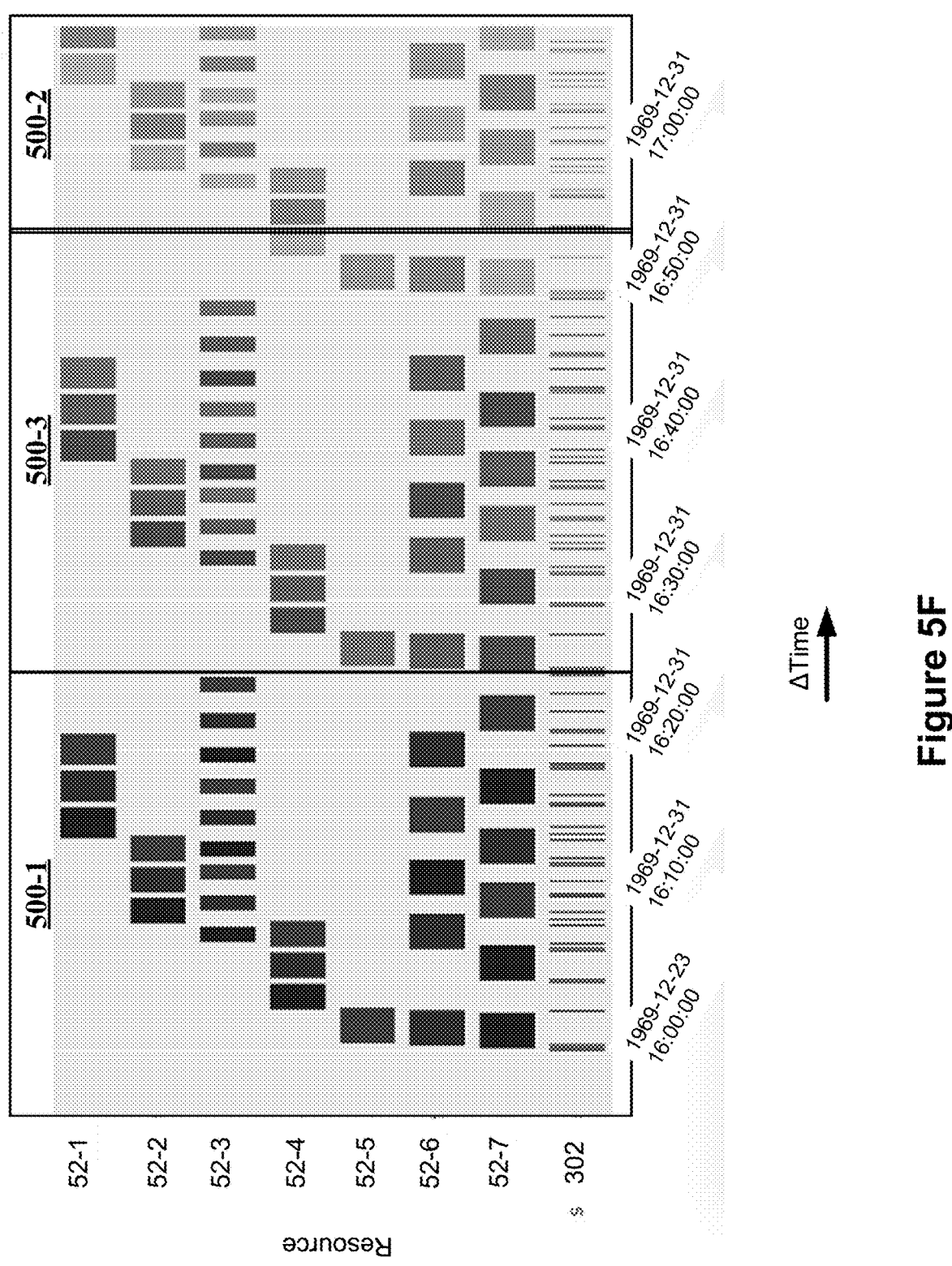
Figure 5G:
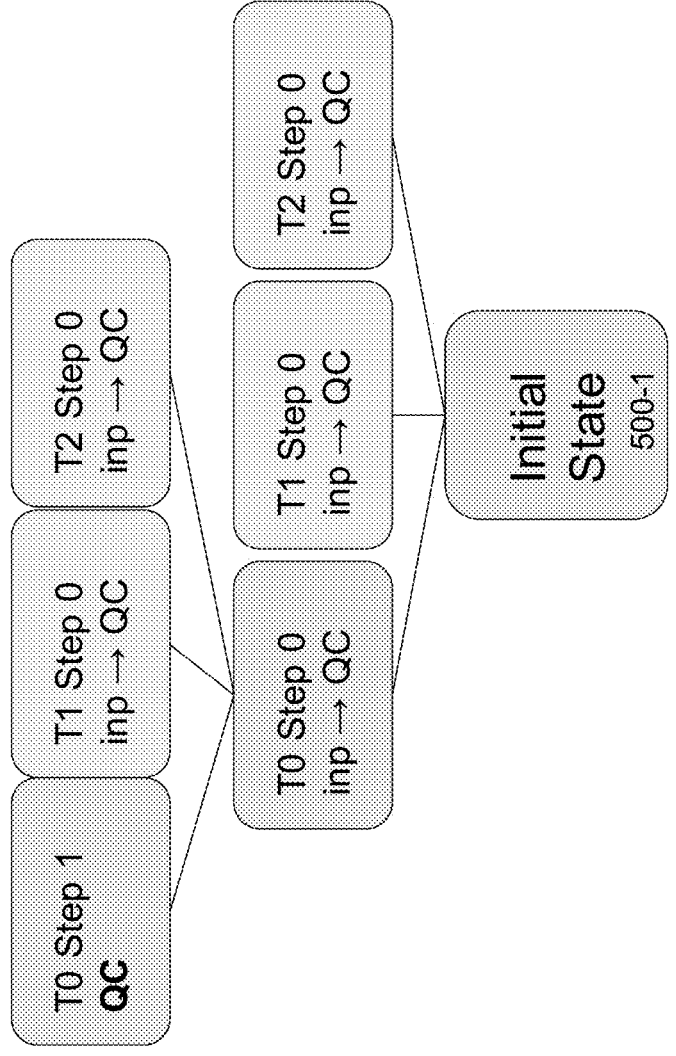
Figure 5H:
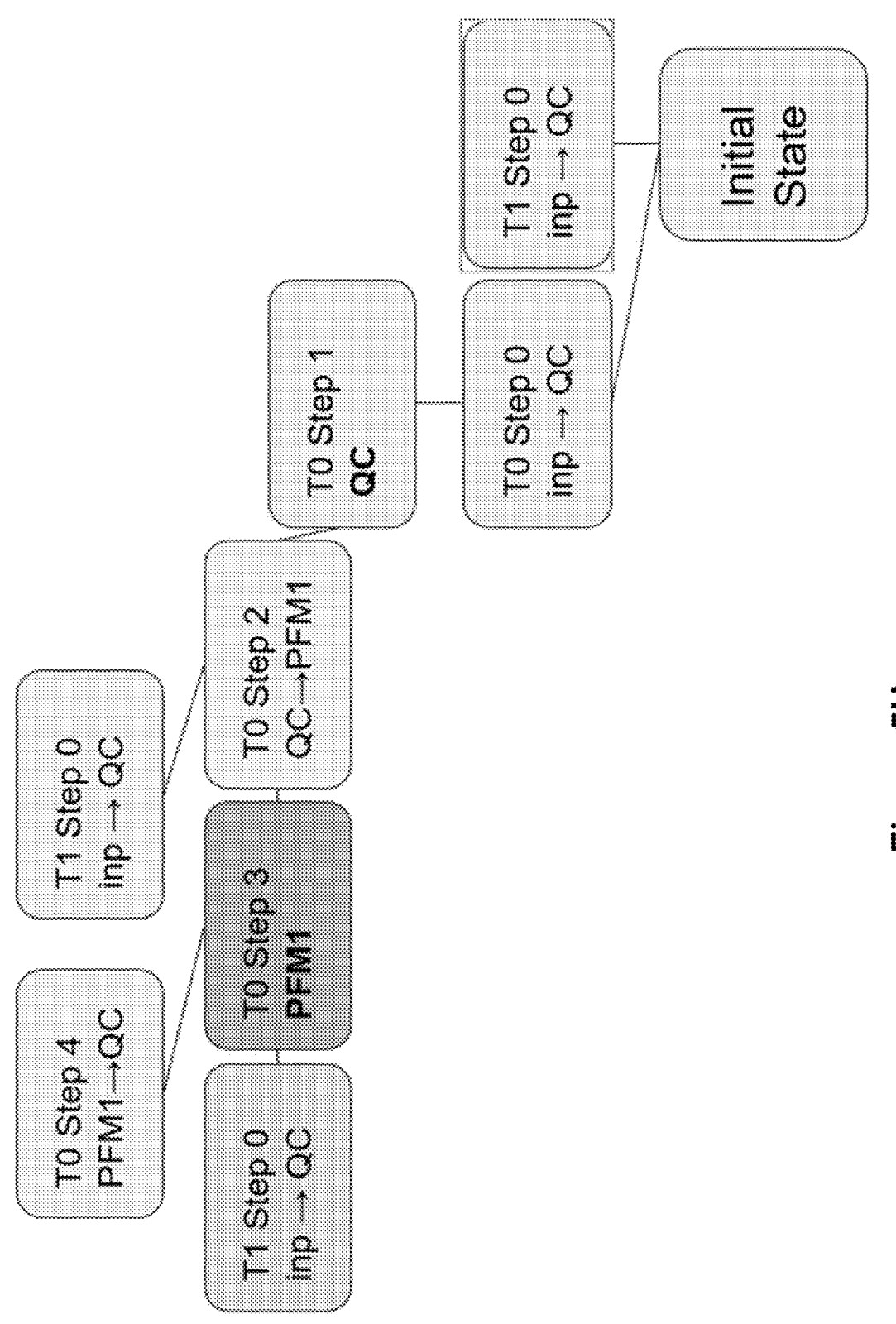

Referring briefly to FIGS. 5E and 5H, in some embodiments, the disruption includes a deadlock between a plurality of instances of a compiled workflow at a biological foundry 300, such as too many portions of manufacture of a plurality of engineering targets as inputs for a respective instrument 52. Accordingly, the present disclosure can translate an instance of a compiled workflow from the representation of the uncompiled workflow and undo state changes back up the tree of the plurality of workflow operations until a valid decision is available for action at a respective instrument. In some embodiments, full state of each node (e.g., of FIG. 5H) is deleted. In some embodiments, the scheduler module 20) builds a search tree based on the temporal order of the plurality of workflow operations, a characteristic of the plurality of workflow operations, a characteristic of the plurality biological foundry operations 16, or a combination thereof, with each node in the search tree associated with a respective feature in the plurality of workflow operations, the characteristic of the plurality biological foundry operations 16, or the combination thereof. In some embodiments, a converging branch is a successive function (e.g., satisfies a criteria of the translation of the representation of the uncompiled workflow and/or a criteria of the executing of the corresponding instance of the compiled workflow). In some embodiments, the scheduler module 20 provides a plan, which in some embodiments is the representation of the uncompiled workflow, that includes a traversal through this search tree, dictating the actions and states conducted at a biological foundry (e.g., the temporal order to produce the plurality of engineering targets at via the plurality of operations 16) go through to finish manufacturing a portion of the plurality of engineering targets. In some embodiments, this includes the time each workflow operation is started in a temporal order. In some embodiments, a naive/greedy approach traverses' tree, taking the first available action it can at each juncture to produce the manufacture of the plurality of engineering targets.

Referring briefly to FIG. 5A through FIGS. 5F, each color represents a temporal order of a plurality of workflow operations of a representation of an uncompiled workflow and/or a corresponding instance of a compiled workflow. Moreover, in some embodiments, each block represents a various foundry operation 16. Referring to FIG. 5B, a biofoundry 300 including instruments 52 is translating and executing a first representation of an uncompiled workflow (blue) and a second representation of the uncompiled workflow (yellow). At some time, both representations are being manufactured at the same time in two different instruments, which is a realization of a parallel structure of implementing a plurality of workflows at a biological foundry. Referring to FIG. 5D, the parallel nature of a biological foundry 300 of the present disclosure allow for parallel planning conducting a plurality of representations of uncompiled workflows at the biological foundry 300, to optimize simultaneous manufacturing of each plurality of engineering targets association with each representation of uncompiled workflows. In this way, at a given point in time, a biological foundry 300 of the present disclosure includes a portion of a plurality of engineering targets in a range of from 1 to 10, 5 to 100, 10 to 1,000, 10,000 targets, 100,000 targets or more. In this way, in some embodiments, the systems and methods of the present disclosure allow for parallel translating and executing of over 10, over 100, over 1000 representations of uncompiled workflows.

Block 414. Referring to block 414, in some embodiments, the method 400 includes translating, via the controller, for each respective organic engineering target in the first plurality of organic engineering targets, the representation of the uncompiled workflow into a second corresponding instance of the compiled workflow for the respective organic engineering target in accordance with the plurality of heuristic constraints associated with the representation of the uncompiled workflow. The second corresponding instance of the compiled workflow includes, for a first instrument in the subset of instruments of the plurality of instructions, a second position other than a first position in the temporal order of the plurality of workflow operation of the first instrument in the first corresponding instance of the compiled workflow, and one or more execution instructions comprising a second traverse instruction commanding the articulated handling robot to move to at least one spatial coordinate associated with the first instrument when executing the second position in the temporal order of the plurality of workflow operation.

Block 416. Referring to block 416, in some embodiments, the method 400 includes determining, via the controller, if the translating satisfies each threshold translation criterion in the plurality of threshold translation criteria.

Block 418. Referring to block 418, in some embodiments, the method 400) includes executing, in accordance with a determination the translating satisfies each threshold translation criterion in the plurality of threshold translation criteria of the determining, the second corresponding instance of the compiled workflow, thus completing a second portion of the manufacture of the plurality of organic engineering targets.

In some embodiments, the plurality of instruments 52 includes one or more instructions of: a bioreactor, a centrifuge, an incubator, a liquid handling robot, a liquid chromatography system, a gas chromatography system, a mass spectrometry system, a microscope, a electrophoresis device, a electroporation device, a clone separation device, a clone selection device, a thermal cycler, a fume hood, a burner, a mill, a cooler, or a combination thereof. One of skill in the art will appreciate that the present disclosure is not limited thereto.

In some embodiments, the plurality of biological foundry operations comprises a capsule deposition operation, a powder deposition operation, a buffer operation, a capsule assembly operation, a quality control operation, or a combination thereof. However, one of skill in the art will appreciate that the present disclosure is not limited thereto.

In some embodiments, the plurality of biological foundry operations comprises a bioreactor operation, a centrifuge operation, a thawing operation, an enrichment operation, a freezing operation, an incubation operation, an activation operation, or a combination thereof. However, one of skill in the art will appreciate that the present disclosure is not limited thereto.

In some embodiments, the plurality of workflow operations comprises a collection operation, a sort operation, an edit operation, a culture operation, a quality control operation, a formulate operation, or a combination thereof. However, one of skill in the art will appreciate that the present disclosure is not limited thereto.

In some embodiments, the plurality of workflow operations are further spatially ordered. From this spatial order forming a spatiotemporally ordered plurality of workflow operations, in that each position in the plurality of workflow operations is associated with a temporal order and a spatial position in the biological foundry 300.

In some embodiments, the plurality of heuristic constraints includes a first heuristic instruction that defines a non-human readable format of the compiled workflow.

In some embodiments, the plurality of workflow operations includes a plurality of series workflow operations, such that a portion of the temporal order of the plurality of workflow operations cannot be modified.

In some embodiments, the plurality of workflow operations includes a plurality of parallel workflow operations.

In some embodiments, the performance score of the first threshold translation criterion comprises a precision of the translating, an accuracy of the translating, a limit of the translating, or a combination thereof.

In some embodiments, the first portion of the manufacture of the plurality of organic engineering targets is less than the second portion of the manufacture of the plurality of organic engineering targets.

In some embodiments, between the executing the first instance of the compiled workflow and the executing the second instance of the compiled workflow, the method completes the manufacture of the plurality of the engineering targets.

In some embodiments, the first traverse instruction is different from the second traverse instruction.

In some embodiments, the obtaining, the first translating, the first determining, the first executing, the second determining, the second translating, the third determining, the second executing, or a combination thereof is conducted without human interference.

In some embodiments, the plurality of heuristic constraints includes a privacy policy.

In some embodiments, the plurality of heuristic constraints includes an encryption policy.

In some embodiments, the plurality of heuristic constraints includes a manufacture recordation policy.

Referring to FIGS. 5A through F5, descriptions of implementations and the scheduling of a workflow (e.g. workflow scheduler module 20 of FIG. 2) are provided.

In some embodiments, a representation of an uncompiled workflow includes determining a temporal order for a plurality of workflow operations at a biological foundry 300. Each workflow operation in the plurality of operations is associated with an operation in a plurality of biological foundry operations (e.g., biological foundry operation 16 associated with a biological foundry operations library 14 of FIG. 2). Collectively, the plurality of biological foundry operations 16 produce some or all of the engineering targets of an engineering target library (e.g., engineering target library 12 of FIG. 2) associated with the biological foundry 300.

In some embodiments, the workflow scheduler module receives a plurality of inputs to generate a representation of an uncompiled workflow. In some embodiments, the plurality of inputs includes a sequence of manufacturing steps for each biological foundry operation 16 in a plurality of biological foundry operations 16 that produce a plurality of engineering targets. In some embodiments, the plurality of inputs includes a configuration of one or more instruments 52 associated with the biological foundry 300, such as a description of each instrument 52 associated with the biological foundry 300 that is further associated with at least one biological foundry operation 16 in the plurality of biological foundry operations 16 that produce the plurality of engineering targets. In some embodiments, the configuration of the one or more instruments 52 associated with the biological foundry further includes a status of a respective instrument 52 in the one or more instruments 52, such as an estimated time to competition for an execution of an instance or a portion of an instance of a compiled workflow: In some embodiments, the inputs include a total number of engineering targets in the plurality of engineering targets and/or a number of unique engineering targets in the plurality of engineering targets. From this, the representation of the uncompiled workflow is provided that includes a temporal order sequence of manufacturing actions (e.g., transfers via articulated handling robot 302, actions at an instrument 52, etc.) describing successful manufacture of the plurality of engineering targets.

Referring to briefly to FIG. 5F, in some embodiments, the representation of the compiled workflow is generated as a charting of each biological foundry operation 16 in the plurality of biological foundry operations 16 that produce the plurality of engineering targets.

In the present disclosure, each workflow is a manufacturing process that produces a plurality of organic engineering targets. To form a representation of an uncompiled workflow, the systems and methods of the presentation disclosure analyzes the manufacturing process by breaking the manufacturing process into a corresponding plurality of biological foundry operations 16. By way of example, in some embodiments, a first plurality of biological foundry operations 16 that produce a first engineering target includes a first biological foundry operation 16-1 of soldering, a second biological foundry operation 16-2 of activation, a third biological foundry operation 16-2 of mixing, a third biological foundry operation 16-3 of filling, a fourth biological foundry operation 16-4 of weighing, a fifth biological foundry operation 16-5 of assembly, a sixth biological foundry operation 16-6 of stuffing, a seventh biological foundry operation 16-7 of facing, an eight biological foundry operation 16-8 of scanning, a ninth biological foundry operation 16-9 of inspection, a tenth biological foundry operation 16-10 of cleaning, etc. One of skill in the art will appreciate that the present disclosure is not so limited. Additionally, in some embodiments, the plurality of biological foundry operations 16 include in breaking up complex biological foundry operation into a plurality of simpler biological operations e.g., a first machining biological foundry operation 16-1 broken up into a second facing biological foundry operation 16-2, a third pocket milling biological foundry operation 16-3, etc. for use in coordination with purpose-built instruments 52 at a biological foundry 300. For each biological foundry operation 16, there is a corresponding instrument 52, or action, which could be a realization of many possible embodiments of the corresponding instrument 52. Each instrument 52 is controlled by a standardized control module attached to the respective instrument 52. This control module receives a plurality of commands (e.g., one or more commands associated with obtaining of block 404 of FIG. 4A, translating 406 of FIG. 4A, determining 408 of FIG. 4A, executing 410 of FIG. 4B, determining 412 of FIG. 4B, translating 414 of FIG. 4B, determining 516 of FIG. 4B, executing 418 of FIG. 4B, or a combination there) and transmits data about a status of executing an instant of a corresponding compiled workflow conducted by the instrument 52. In some embodiments, a respective instrument 52 will perform different biological foundry operations 52 depending on the commands provided to the respective instrument 52 and the plurality of organic engineering targets for that instance of the compiled workflow. For example, in some embodiments, an aseptic bottle filling instruments 52-1 fills a specific compound of a respective formulation, and depending on a correspond position in a temporal order of the plurality of workflow operations based on the plurality of biological foundry operations 16, that plurality of workflow operations to produce the formulation will call for various volumes of liquid. Consider, a bottle A instrument 52-2 is input to the filling instrument 52-1, and filled will 100 milliliters (mL) and then removed and processed by a first weigh-checker instrument 52-3, once the bottle A 52-2 is removed from the bottle filling instrument 52-1, a bottle B 52-4 is input into the bottle filling instrument 52-1 and filled with 250 mL and then processed by a second weigh-checker instrument 52-5. However, the present disclosure is not so limited, as this concept translates across a plurality of workflow operations and corresponding biological foundry operations 16 including powder filling, tableting, machining depths, pick-and-place operations, etc. According, the systems and method of the present disclosure allow for customization of the instruments 52 used for executing a corresponding instance of the representation of the uncompiled workflow, being designed with the capacity to flexibly adapt to changes in temporal order and/or process, or spatial order.

Referring briefly to FIGS. 3A and 3B, a portion of a manufacture of a plurality of engineering targets produced by a workflow is shuttled into a respective instrument 52 via an articulated handling robot 302. In some embodiments, the articulated handling robot 302 is configured as an corresponding instrument 52 in the plurality of instruments 52, such that a capacity of the articulated handling robot 302 and/or transport path 304 to handle a portion of the manufacture of the plurality of engineering targets is considered in translating the representation of the uncompiled workflow into a corresponding instance of the compiled workflow: The portion of the manufacture of the plurality of engineering targets is then conveyed out of a first instrument 52-1 by the articulated handling robot 302 to a second instrument 52-2. Accordingly, the plurality of biological foundry operations 16 from the plurality of workflow operations the manufacture of the plurality of engineering targets is performed by moving the portion of the manufacture of the plurality of engineering targets through the plurality of instruments 52 of the biological foundry 300 until all needed biological foundry operations 16 associated with the representation of the uncompiled workflow are executed as instances of the compiled workflow, and the manufacture of the plurality of engineering targets is completed. In some embodiments, this completion of the portion the manufacture of the plurality of engineering targets is a heuristic constraint (e.g., a threshold translation criterion). Accordingly, the plurality of workflow operations that produce the plurality of engineering targets is performed at the biological foundry 300 in a fully-planned manner, fixed-scheduled manner and/or a flexible-scheduled manner, or a dynamic manner.

In some embodiments, a fully-planned set of a plurality of workflow operations of a workflow to produce a plurality of engineer targets is one where an exact temporal order of a plurality of biological foundry operations 16 is tightly prescribed in advance to generating a representation of an uncompiled workflow of the workflow and translating the representation. In some embodiments, such fully planned plurality of workflow operations is not modified in real time. Instead, in such embodiments, the plurality of biological foundry operations 16 is fully written out as a predetermined process, and the systems and methods of the present disclosure do not deviate from the predetermined plurality of biological foundry operations 16 for the plurality of workflow operations. By way of example, this predetermined plurality of biological foundry operations 16 is associated with the plurality of workflow operations having a temporal order of a first instrument 52-1 at a first position in the temporal order, a second instrument 52-2 at a second position in the temporal order after the first position, . . . a M instrument 52-M at position M after both the first position and the second position. However, the present disclosure is not so limited. In this example, parallelization of the plurality of biological foundry operations 16 is accomplished by the systems and methods of the present disclosure by staggering the introduction of the portion of the manufacture of the plurality of engineering targets from an initial input instrument of the biological foundry 300. In this way, in some embodiments, a workflow operation in the plurality of workflow operations is a sorting of a plurality of respective images of uncompiled workflows to be processed at the biological foundry 300.

In some embodiments, a fixed-scheduled set of a plurality of respective images of uncompiled workflows is one where the set of the plurality of respective images of uncompiled workflows is given to a schedule optimization algorithm (e.g., workflow schedule module 20 of FIG. 2) where each respective image in the plurality or respective images, or a portion of a respective image in the plurality of images, has a fixed sequence of workflow operations in a corresponding plurality of workflow operations associated with the respective image. Accordingly, the systems and methods of the present disclosure sort the plurality of respective instance of uncompiled workflows to optimize production output at the biological foundry 300. (e.g., process a first respective instance then a third respective instance followed by a second respective instance). However, the present disclosure is not so limited.

In some embodiments, a flexible-scheduled plurality of respective representations of uncompiled workflows is one where there is a flexibility to the temporal order of a plurality of biological foundry operations 16 performed to manufacture the plurality of engineering targets. For example: consider a plurality of workflow operations of filling and weighting a plurality of compounds, mixing the filled and weighted plurality of compounds, and packaging the mixture of the plurality of compounds, with an indeterminate temporal order for filling and weight (e.g., filling and weight either compound in the plurality of compounds in any order). Moreover, in such embodiments, more than one instrument 52 is capable of conducting the plurality of biological operations 16 (e.g., a portion of the manufacture could go to any filling instrument 52 or any weighing instrument 52 in no exact sequence as long as it is ultimately mixed before packaging). Accordingly, an optimization module (e.g., workflow optimization module 24 of FIG. 2) computes an optimal sequence to complete each respective representation in the plurality of respective representations of uncompiled workflow given that the systems and methods of the present disclosure can shuffle a temporal order of the plurality of workflow operations of the respective representation and a respective configuration layout of a biological foundry 300 with a specific number of instruments 52. Accordingly, in some embodiments, there is no fixed path (e.g., about a transport path 304, advanced by articulated handling robot 302) that a respective portion of the manufacture of the plurality of engineering targets must follow (e.g., from a first instrument 52-1 to a second instrument 52-2). Rather, a plurality of workflow operations must be done before completing the manufacture of the plurality of engineering targets. This also applies in some embodiments where one or more subsets of workflow operations in the plurality of workflow operations can be shuffled but still need some sequence within each subset in the one or more subsets. By way of example, consider a first workflow operation of lay down first adhesive, a second workflow operation of place first component, a third workflow operation of apply adhesive curing for first adhesive, a fourth workflow operation of place component, a fifth workflow operation of insert thread-locking fluid to bosses for second component, a sixth workflow operation of pick and drive mounting screws for second component, a seventh workflow operation of check torque of mounting screws, an eighth workflow operation of apply solder paste for third component location, a ninth workflow operation of pick and place third component, a tenth workflow operation of reflow and solder third component 3 on a base. Accordingly, within the plurality of workflow operations the exact temporal order must be followed but each biological founder operation 16 associated with a corresponding workflow operation in the plurality of workflow operations can be done by a different instrument 52 in a plurality of instruments 52 at the biological foundry 300, and thus a respective portion of the manufacture of the plurality of engineering targets execute a first subset of biological foundry operations in the plurality of biological foundry operations 16 before executing a second subset of biological foundry operations in the plurality of biological foundry operations 16 based on one or more determinations of the workflow scheduler module 20 and the workflow oversight module 30.

In some embodiments, a dynamically-scheduled plurality of respective representations of uncompiled workflows is one in which a similar flexible-scheduled representation of an uncompiled workflow is constantly updated by the server 200 and/or a controller of the biological foundry 300 to account for one or more disturbances at the server and/or the biological foundry 300. In some embodiments, the one or more disturbances is associated with at least one heuristic constraint in a plurality of heuristic constraints. In some embodiments, the plurality of disturbances include a disruption in communication with a respective instrument 52 at the biological foundry, a completion of a manufacture of a plurality of engineering targets of an instance of a compiled workflow (e.g., an instrument 52 coming offline from production at the biological foundry), one or more biological foundry operations 16 consuming a longer or shorter period of times than expected, one or more instrument 52 failures, one or more biological foundry operation 16 failures that require the instance of the compiled workflow to be restarted at the biological foundry or the instrument 52, or a combination there etc. However, the present disclosure is not so limited. For example, if there are multiple instruments 52 associated with a respective biological foundry operation 16 (e.g., for redundancy), a first instance of the compiled workflow includes a first instrument 52-1 associated with a first biological foundry operation 16-1 and a second instrument 52-2 associated with the first biological foundry operation 16-1 are both filling the same compound to complete the manufacture of the plurality of engineering targets of the workflow: Accordingly, if the first instrument has a disruption (e.g., for maintenance) the workflow scheduler module 20 translate the respective image of the uncompiled workflow into a second instance of the compiled workflow that accounts for a temporary removal of the first instrument 52-1 from the biological foundry 300 in order to compensate for the possibility of a bottleneck.

Accordingly, the scheduling and oversight provided through the workflow oversight module 30 and the workflow scheduler module 20 of the server 200 provides several key benefits—parallelism, modularity, and flexibility—to arbitrary workflow operations that form a basis for a plurality of biological foundry operations 16. One such benefit being that a sum of these modules enables mass customization of manufacture of a plurality of engineering targets at the biological foundry by translating a representation of an uncompiled workflow into one or more instances of a compiled workflow. Many batches or parts can be manufactured with very different and unique sequences of operations performed simultaneously. This maximizes utilization and throughput while also allowing for high-variation in the plurality of engineering targets. Therefore, one such application of the systems and methods of the present disclosure of is mass customization of manufacturing a plurality of engineering targets at a biological foundry 300, where the plurality of engineering targets can be fully personalized to each workflow and mass-production scales of engineering targets can be manufactured in parallel at the biological foundry 300 to enable the same scale and throughput of serial manufacturing.

Accordingly, the present disclosure enables the parallel performance of a plurality of instances of compiled workflows, such as over 10 instances of compiled workflows or more.

As described supra, the systems and methods of the present disclosure are designed in a distributed and event-based fashion specifically to enable newfound parallelism and flexibility at a biological foundry 300.

Figure 6:
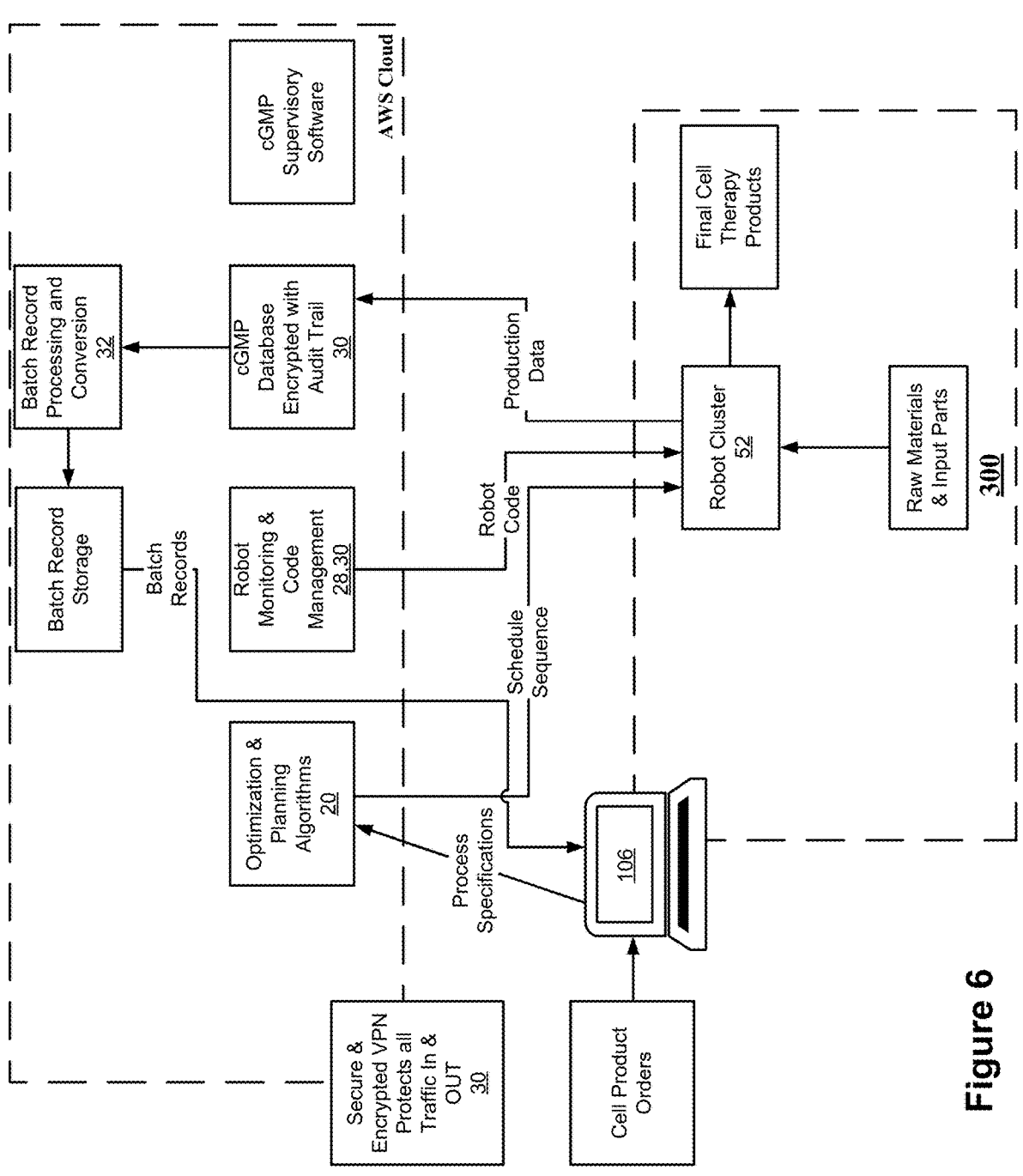
FIG. 6 illustrates another exemplary biological foundry workflow system topology including a server system and a computer system associated with a biological foundry, in accordance with an embodiment of the present disclosure.

Referring to FIG. 6, an illustration of a system 100 of the present disclosure that provides a plurality of data elements of a representation of an uncompiled workflow and a plurality of heuristic constraints that control commands flow through. In some embodiments, the plurality of heuristic constraints includes a privacy policy. In some embodiments, the plurality of heuristic constraints includes an encryption policy. In some embodiments, the plurality of heuristic constraints includes a manufacture recordation policy. In some embodiments, the plurality of heuristic constraints In some embodiments, the flow of data elements between a server 200 and a biological foundry 300 is through a communication network 106. Accordingly, a flexible plurality of distributed interfaces that allow the biological foundry 300 to manage highly complex and dynamic workflows to produce a plurality of engineering targets is provided.

Each instrument 52 at a biological foundry 300 has a control system (e.g., controller) attached to one or more instruments in the plurality of instruments 52 that can interface with the communications network, and, therefore, the server 200 and the workflow scheduler module 20 and the workflow oversight module 30. This allows each respective instrument 52 to perform exactly a first biological foundry operation 16 for a manufacture of a first plurality of engineering targets and flexibly change to a second biological foundry operation 16 for a manufacture of a second plurality of engineering targets. Accordingly, this control system is a separate and universal modular component to each respective instrument 52, in that any respective instrument 52, which could be include only off-the-shelf components, is integrated into the biological foundry 300 by the control system. Effectively, this control system acts as a specialized industrial gateway which can take in custom firmware from the server 200 via the communications network 106 to control and administer the translating of a representation of an uncompiled workflow into a corresponding instance of a compiled workflow. Moreover, in some embodiments, the control system determines if the executing of the corresponding instance of the compiled workflow and/or the translating of the corresponding instance of the compiled workflow satisfied each threshold criterion in a plurality of threshold criteria. In some embodiments, the plurality of threshold criteria is uniquely associated with the corresponding instance of the compiled workflow. In some embodiments, the plurality of threshold criteria is uniquely associated with the representation of the uncompiled workflow. In some embodiments, the control systems associates a respective instrument 52 (e.g., a new instrument 52) with a corresponding biological foundry operation 16 by integrating the respective instrument into a cluster of instruments 52 associated with the corresponding biological foundry operation 16. In this way, in some embodiments, the cluster of instruments (e.g., plurality of instruments) associated with the corresponding biological foundry operation 16 form a pool of available instruments 52 to execute the corresponding biological foundry operation 16. For example: a computer numerical control (CNC) instrument 52, a pipetting instrument 52, a custom pill counting instrument 52, an articulated handling robot 302, a machine vision comparator instrument 52, or a combination thereof could be integrated by adding a respective instrument 52 to the control system (e.g., loading a plurality of drivers for the respective instrument 52 into the control system) when translating and/or executing the corresponding instance of the compiled workflow. Accordingly, the control system of the present disclosure allows for abstractions of a plurality of instruments 52 and harmonizes a diverse plurality of biological foundry operations 16 into a unified architecture for a biological foundry 300.

In addition to this, the systems and methods of the present disclosure provide a corresponding computer system enabled by the communication network 106, such that the server 200 and the biological foundry 300 are remote from one another. In such embodiments, a plurality of data elements is collected from the biological foundry and communicated to the server 200 for monitoring (e.g., workflow oversight module 30 of FIG. 2) and/or recordation (e.g., workflow record store 32 of FIG. 2) when and/or after obtaining a representation of an uncompiled workflow, translating the representation into an instance of a compiled workflow, executing the corresponding instance of the compiled workflow: or a combination thereof. Accordingly, in some embodiments, the plurality of heuristic constraints is deployed to the biological foundry 300 from the server 200 at runtime to ensure security, compliance, quality, flexibility or a combination thereof, to apply continuous development directly to the plurality of instruments 52 at the biological foundry 300. The plurality of heuristic constraints allows remote operation of a respective biological foundry 300 from a remote server 200 that has the access to the system and methods of the present disclosure. That is to say, in some embodiments, a centralized server 200 can monitor all deployments of a plurality of representations of an uncompiled workflow securely, regulate the deployment of which a plurality of corresponding instances of compiled workflows is executed at a respective biological foundry 600, and log and track all systems with fine-grained resolution. As well, this deployment allows for a unifying architecture across many different workflow operations and biological foundry operations 16, and for a flexible manufacturing platform at a respective biological foundry 300 in a plurality of biological foundries 300.

In some embodiments, for collection of a plurality of data elements from a respective biological foundry 300 when implementing one or more workflows at the respective biological foundry 300 (e.g., method 400 of FIGS. 4A and 4B), storage of the plurality of data elements (e.g., workflow record store 32 of FIG. 2), and logging of the plurality of data elements, the systems and methods of the present disclosure leverages the distributed architecture of the respective biological foundry described above, in that: each respective instrument 52 in a plurality of instruments has a corresponding controller (e.g., control system) which can transmit and receive data over the communication network 106 to the server 200. Typically, as shown in FIG. 6, the instruments 52 transmit data elements to and from a workflow oversight module 30 and/or a workflow schedule module 20 of a server, or, optionally, on site at the biological foundry 300, and these scheduling modules 20 and oversight modules 30 queue and then package and deliver the plurality of data elements to and/or from the server 200. However, the present disclosure is not so limited as the systems and methods of the present disclosure are flexibly designed such that direct connections to the server 200 can be established for one or more instruments 52.

For the above described modules that control, operate, and manage the plurality of biological foundry operations 16 and the plurality of instruments 52, a corresponding workflow record 34 is stored at the server 200, which is a well-controlled, tested, and validated representation of an uncompiled workflow and/or instance of a compiled workflow. When an instrument 52 begins executing one or more instruments for manufacturing the plurality of engineering targets. e.g. at the start of an instance of a compiled workflow, the instructions needed for that instance could be used for more than workflow with differing needs at the biological foundry 300, and is sent from the server 200 to the plurality of instruments 52. As the instructions are loaded into the instrument from the server 200, the control system conducts a plurality of determinations based on a plurality of heuristic constraints to determine a security and/or an integrity of the instructions, and compares the translation of the representation of uncompiled workflow with the corresponding instance of the compiled workflow, or an executing of the corresponding instance of the compiled workflow to the workflow record 30 stored at the server 200 to ensure that there has been no data loss in obtaining the representation of the uncompiled workflow at the biological foundry 300 in the translating into the corresponding instance, or in the executing the corresponding instance, and that the representation of the uncompiled workflow and/or the corresponding instance exactly matches a corresponding workflow record. The download, results of comparison, and versions pulled are all logged. In some embodiments, once the manufacture of the plurality of engineering targets has completed running, the workflow record 34 can be deleted and removed from the workflow record store 32 of the server 200. This removal is an integrity measure, in that the removal of the workflow record 34 prevents the representation of the uncompiled workflow and/or the corresponding instance of the compiled workflow from being executed at a respective biological foundry without the correct configuration and connection. Moreover, this removal prevents reverse engineering or theft of the control system should the control system be installed on the site of a remove biological foundry. Furthermore, this removal of the workflow record 34 prevents degradation or misconfiguration of the control system itself by making sure that the only instant representation and/or corresponding instance of the compiled workflow is that which has been delivered via the server 200 and the workflow record store 32.

Accordingly, both the hardware and the computer system of the systems and methods of the present disclosure is designed in a modular fashion, such that it can be scaled to demand or process: more or fewer instruments 52 can be associated with a corresponding biological foundry operation 16, multiple instruments 52 can be assembled in a respective biological foundry 300, and the systems and methods of the present disclosure can be scaled up as separate instances or by adding or reducing computational resources for a given instance of a compiled workflow. Accordingly, an aspect of the present disclosure provides a widely flexible biological foundry 300 architecture for a plurality of biological foundry operations 16.

In the specific example of pharmaceutical engineering targets, without loss of generality, the one or more instruments 52 associated with a corresponding biological foundry operation 16 includes: powder dispensing (e.g., precisely dosing pharmaceutical formulations into the capsules), mini-tablet and/or tablet dispensing (which deposit precise counts of pre-formulated mini-tablets), capsule weighing systems for in-process quality control, spectroscopic material identification modules for in-process quality control, capsule assembly systems (for assembly multi-compartment capsules and closing capsules), machine vision inspection systems, and packaging equipment for bulk and/or singulated packaging. Within this hardware architecture, capsules can be filled with many different formulations with high precision. Consider a corresponding biological foundry operation 16 having fourteen associated instruments 52. In one embodiment, two powder filling instruments 52 for formulation A (which may be a complex or simple formulation of a pharmaceutical composition, with many excipients or only consisting of Active Pharmaceutical Ingredient (API)), two powder filling instruments 52 for formulation B, two mini-tablet filling instruments 52 for tablet formulation C, three weighing instruments 52 for in-process quality control, two packaging instruments 52 for bottling the portion of manufacture of the plurality of engineering targets, three assembly machines configured for capping and for multi-compartment division (e.g., sealing with walls of a capsule different portions of manufacture of the plurality of engineering targets). In some embodiments, each of these instruments 52 includes a control system (e.g., workflow scheduler module 20 of FIG. 2 and/or workflow oversight module 30 of FIG. 2), which allows for a respective instrument 52 to be controlled and/or monitored by a remote server 200, and thereby interface with the instruments 52 in the biological foundry 300. In some embodiments, a larger biological foundry 300 could house several of these clusters of instruments associated with a respective biological foundry operation 16 in a group capable of the same scale of a traditional mass-production facility.

Consider a biological foundry 300 would be able to flexibly process many different prescribed patient orders for a plurality of engineering targets: patient 1 needs a first engineering target of 5 mg of formulation A, a second engineering target of 80 mg of formulation B. and a third engineering target of two tablets of tableted formulation C, while another patient (patient 2) requires a fourth engineering target 20 mg of A, a sixth engineering target of 40 mg of B and 1 tablet of C, while another patient (patient 3) requires a seventh engineering target of 60 mg of B and an eight engineering target of one tablet of C only. One of skill in the art will appreciate that the present disclosure is not so limited, such that there are highly combinatorial variations on the possible plurality of engineering targets. The plurality of workflow operations for any of these combinations of engineering targets follows from the order itself: for all patient's products, the tray of the portion of manufacture of the plurality of engineering targets capsules is first weighed for tare weight: next the portion of manufacture of the plurality of engineering targets for patient 1 is moved to a filling instrument 52 for formulation A and is filled with 5 mg dose of formulated product; parallel, the portion of manufacture of the plurality of engineering targets for patient 2 is moved to another formulation A filling instrument and is filled with its specified 20 mg dose; while the patient 3 portion of manufacture of the plurality of engineering targets is inserted in a filling instrument 52 for formulation B after the portion of manufacture of the plurality of engineering targets of patient 3 has been weighed: right after the first filling is finished for any given portion of manufacture of the plurality of engineering targets it would be moved back into one of the open weighing machines; after weight is checked, the capsules of the portion of manufacture of the plurality of engineering targets are sealed in the assembly instrument 52: this sequence of position in the temporal order of the plurality of workflow operations continues forward, processing each biological foundry operation in the plurality of biological foundry operations 16 step, including quality control, to manufacture not only these example prescription portions of manufacture of the plurality of engineering targets, but can produce dozens or hundreds of engineering targets in the plurality of engineering targets in parallel. The claims describe well the modularity of the system, both in terms of factory architecture (we can realize each task of the manufacturing process with a different module, and we can swap modules if necessary) and in terms of software (the planning algorithms can adapt to all different module configurations).

Accordingly, the systems and methods of the present disclosure enables the parallel manufacturing of a plurality of engineering targets at the same time. In some embodiments, the plurality of engineering targets is associated with one compiled workflow. In some embodiments, the plurality of engineering targets is associated with two or more compiled workflows (e.g., a first plurality of engineering targets of a first compiled workflow and a second plurality targets of a second workflow). This allows for making personalized engineering targets (e.g. drug products) in parallel at a biological foundry. Moreover, this allows for scaling of producing personalized medicine at a foundry 300. The systems and methods of the present disclosure provide the scheduler module 20 and the oversight module 20 with at least allow for a planning of a plurality of workflows at a foundry 300 and is able to receive and communicate multiple representations of uncompiled workflows and/or (e.g. realize 10 different products) and then schedule a sequence of tasks that will realize all those personalized products in an efficient manner (saturating all the available manufacturing instruments 52). This means that a schedule module 20 provides a flow designed to to optimize the parallel manufacturing of individualized engineering targets in a plurality of targets at a foundry 300. This is an advantage with respect to traditional serial systems (in which products are made one after the other—not simultaneously—and in which the sequence of tasks is identical for all products). The systems and methods of the present disclosure, on the other hand, allow for multiple engineering targets to be made at the same time (increased efficiency) and for the sequence of tasks when translating a respective instance of a compiled workflow from a representation of an uncompiled workflow to be different for each product (increased flexibility).

One aspect of the system and methods of the present disclosure Food and Drug Administration (FDA) required Good Manufacturing Practices. As described above, the server 200 based deployment of a plurality of representations of an uncompiled workflow ensures that only validated representations is translated and executed at a biological foundry (e.g., loaded into an instrument 52), and by deleting and reloading with threshold criteria determination constraints, the present disclosure ensures that the representation cannot be tampered with or misconfigured between uses or batches/shifts, either at the biological foundry 300 or during communication through the communications network 106.

Simultaneously, this system enables a scalable deployment of many FDA-grade manufacturing backends which could be separated from client to client. Contrast this with the traditional case where systems must be validated and re-validated at any new install, whereas this system needs to be instance-qualified and checked with much simpler validation by client. This scalability translates into readily deploying many clusters of manufacturing robots, achieving industrial scale for the manufacturing of personalized drug products.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that includes a computer program mechanism embedded in a non-transitory computer-readable storage medium. For instance, the computer program product could contain instructions for operating the user interfaces described with respect to FIGS. 2, 3, 4, 5, 6, and 7. These program modules can be stored on a CD-ROM, DVD, magnetic disk storage product, USB key, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A method of implementing one or more compiled workflows at a biological foundry:

the biological foundry comprising one or more processors, a memory storing one or more programs for execution by the one or more processors, a controller, a communications interface in electrical communication with at least a power supply and a plurality of peripheral devices comprising an articulated handling robot, wherein the articulated handling robot is configured to advance the one or more compiled workflows from one or more instruments in a plurality of instruments, wherein each respective instrument in the plurality of instruments is associated with a corresponding biological foundry operation in a plurality of biological foundry operations;

the one or more programs singularly or collectively using the one or more processors to execute a method comprising:

(A) obtaining, in electronic form, from a remote device, a representation of an uncompiled workflow that is configured to produce a first plurality of organic engineering targets at a plurality of biological foundries, wherein the uncompiled workflow is associated with a predetermined set of a plurality of workflow operations, each workflow operation in the plurality of workflow operations being an operation in the plurality of biological foundry operations and defined by an administrator of the remote device, and wherein the plurality of workflow operations is temporally ordered in accordance with a decision tree defined by the administrator and a plurality of heuristic constraints;

(B) translating, via the controller, using a first set of nodes in a plurality of nodes of the decision tree, for each respective organic engineering target in the first plurality of organic engineering targets, the representation of the uncompiled workflow into a first corresponding instance of a compiled workflow for the respective organic engineering target in accordance with the plurality of heuristic constraints associated with the representation of the uncompiled workflow, wherein the first corresponding instance of the compiled workflow comprises:

(i) for each respective instrument in a subset of instruments of the plurality of instruments:

(a) a corresponding position in the temporal order of the plurality of workflow operations based on the corresponding biological foundry operation associated with the respective instrument, and (b) one or more corresponding execution instructions comprising a corresponding first traverse instruction commanding the articulated handling robot to move to at least one corresponding spatial coordinate associated with the respective instrument;

(C) determining, via the controller, if the translating (B) satisfies each threshold translation criterion in a plurality of threshold translation criteria associated with the translation of the uncompiled workflow, wherein a first threshold translation criterion comprises a performance score based on a comparison of the representation of the uncompiled workflow and the compiled workflow and defined at least in part, by the decision tree;

(D) executing, in accordance with a determination the translating (B) satisfies each threshold translation criterion in the plurality of threshold translation criteria of the determining (C), the first corresponding instance of the compiled workflow, thereby completing a first portion of the manufacture of the plurality of organic engineering targets;

(E) determining, via the controller, if a status of the executing (D) satisfies each threshold execution criterion in a plurality of threshold execution criterion associated with the translation of the uncompiled workflow, wherein a first threshold execution criterion is associated with a disruption associated with a condition at the biological foundry defined by the decision tree;

(F) translating, via the controller, using a second set of nodes, different from the first plurality of nodes, in the plurality of nodes of the decision tree, for each respective organic engineering target in the first plurality of organic engineering targets, the representation of the uncompiled workflow into a second corresponding instance of the compiled workflow for the respective organic engineering target in accordance with the plurality of heuristic constraints associated with the representation of the uncompiled workflow, wherein the second corresponding instance of the compiled workflow comprises:

(i) for a first instrument in the subset of instruments of the plurality of instruments:

(a) a second position other than a first position in the temporal order of the plurality of workflow operation of the first instrument in the first corresponding instance of the compiled workflow, and (b) one or more execution instructions comprising a second traverse instruction commanding the articulated handling robot to move to at least one spatial coordinate associated with the first instrument when executing the second position in the temporal order of the plurality of workflow operation;

(G) determining, via the controller, if the translating (F) satisfies each threshold translation criterion in the plurality of threshold translation criteria; and (H) executing, in accordance with a determination the translating (F) satisfies each threshold translation criterion in the plurality of threshold translation criteria of the determining (G), the second corresponding instance of the compiled workflow, thereby completing the second portion of the manufacture of the plurality of organic engineering targets.

2. The method according to claim 1, wherein the biological foundry further comprises a transport path configured to accommodate the articulated handling robot.

3. The method according to claim 1, wherein the plurality of instruments comprises a bioreactor, a centrifuge, an incubator, a liquid handling robot, a liquid chromatography system, a gas chromatography system, a mass spectrometry system, a microscope, a electrophoresis device, a electroporation device, a clone separation device, a clone selection device, a thermal cycler, a fume hood, a burner, a mill, a cooler, or a combination thereof.

4. The method according to claim 1, wherein the plurality of biological foundry operations comprises a capsule deposition operation, a powder deposition operation, a buffer operation, a capsule assembly operation, a quality control operation, or a combination thereof.

5. The method according to claim 1, wherein the plurality of biological foundry operations comprises a bioreactor operation, a centrifuge operation, a thawing operation, an enrichment operation, a freezing operation, an incubation operation, an activation operation, or a combination thereof.

6. The method according to claim 1, wherein the plurality of workflow operations comprises a collection operation, a sort operation, an edit operation, a culture operation, a quality control operation, a formulate operation, or a combination thereof.

7. The method according to claim 1, wherein the plurality of workflow operations is further spatially ordered, thereby forming a spatiotemporally ordered plurality of workflow operations.

8. The method according to claim 1, wherein the plurality of heuristic constraints comprises a first heuristic instruction that defines a non-human readable format of the compiled workflow.

9. The method according to claim 1, wherein the plurality of workflow operations comprises a plurality of series workflow operations.

10. The method according to claim 1, wherein the plurality of workflow operations comprises a plurality of parallel workflow operations.

11. The method according to claim 1, wherein the performance score of the first threshold translation criterion comprises a precision of the translating, an accuracy of the translating, a limit of the translating, or a combination thereof.

12. The method according to claim 1, wherein the executing (D) and the executing (H) completes the manufacture of the plurality of the engineering targets.

13. The method according to claim 1, wherein the first traverse instruction is different from the second traverse instruction.

14. The method according to claim 1, wherein the obtaining (A), the translating (B), the determining (C), the executing (D), the determining (E), the translating (F), the determining (G), the executing (H), or a combination thereof is conducted without human interference.

15. The method according to claim 1, wherein the plurality of heuristic constraints comprises a privacy policy, an encryption policy, and a manufacture recordation policy.

16. The method according to claim 1, wherein the obtaining (A), the translating (B), the determining (C), the executing (D), the determining (E), the translating (F), the determining (G), the executing (H), or a combination thereof is conducted in real time.

17. The method according to claim 1, wherein the determining (E) comprises traversing a prior node utilized in the determining (C).

18. The method of claim 1, wherein the disruption associated with the condition at the biological foundry comprises a temporary removal of the first instrument from the biological foundry.

19. A computer system for implementing one or more compiled workflows, the computer system comprising one or more processors, a memory storing one or more programs for execution by the one or more processors, a controller, a communications interface in electrical communication with at least a power supply and a plurality of peripheral devices comprising an articulated handling robot, wherein the articulated handling robot is configured to advance the one or more compiled workflows from one or more instruments in a plurality of instruments, wherein each respective instrument in the plurality of instruments is associated with a corresponding biological foundry operation in a plurality of biological foundry operations;

the one or more programs singularly or collectively using the one or more processors to execute a method comprising:

(A) obtaining, in electronic form, from a remote device, a representation of an uncompiled workflow that is configured to produce a first plurality of organic engineering targets, wherein the uncompiled workflow is associated with a predetermined set of a plurality of workflow operations, each workflow operation in the plurality of workflow operations being an operation in the plurality of biological foundry operations and defined by an administrator of the remote device, and wherein the plurality of workflow operations is temporally ordered in accordance with a decision tree defined by the administrator and a plurality of heuristic constraints;

(B) translating, via the controller, using a first set of nodes in a plurality of nodes of the decision tree, for each respective organic engineering target in the first plurality of organic engineering targets, the representation of the uncompiled workflow into a first corresponding instance of a compiled workflow for the respective organic engineering target in accordance with the plurality of heuristic constraints associated with the representation of the uncompiled workflow, wherein the first corresponding instance of the compiled workflow comprises:

(i) for each respective instrument in a subset of instruments of the plurality of instruments:

(a) a corresponding position in the temporal order of the plurality of workflow operations based on the corresponding biological foundry operation associated with the respective instrument, and (b) one or more corresponding execution instructions comprising a corresponding first traverse instruction commanding the articulated handling robot to move to at least one corresponding spatial coordinate associated with the respective instrument;

(C) determining, via the controller, if the translating (B) satisfies each threshold translation criterion in a plurality of threshold translation criteria associated with the translation of the uncompiled workflow, wherein a first threshold translation criterion comprises a performance score based on a comparison of the representation of the uncompiled workflow and the compiled workflow and defined at least in part, by the decision tree;

(D) executing, in accordance with a determination the translating (B) satisfies each threshold translation criterion in the plurality of threshold translation criteria of the determining (C), the first corresponding instance of the compiled workflow, thereby completing a first portion of the manufacture of the plurality of organic engineering targets;

(E) determining, via the controller, if a status of the executing (D) satisfies each threshold execution criterion in a plurality of threshold execution criterion associated with the translation of the uncompiled workflow, wherein a first threshold execution criterion is associated with a disruption associated with a condition associated with the computer system defined by the decision tree;

(F) translating, via the controller, using a second set of nodes, different from the first plurality of nodes, in the plurality of nodes of the decision tree, for each respective organic engineering target in the first plurality of organic engineering targets, the representation of the uncompiled workflow into a second corresponding instance of the compiled workflow for the respective organic engineering target in accordance with the plurality of heuristic constraints associated with the representation of the uncompiled workflow, wherein the second corresponding instance of the compiled workflow comprises:

(i) for a first instrument in the subset of instruments of the plurality of instruments:

(a) a second position other than a first position in the temporal order of the plurality of workflow operation of the first instrument in the first corresponding instance of the compiled workflow, and (b) one or more execution instructions comprising a second traverse instruction commanding the articulated handling robot to move to at least one spatial coordinate associated with the first instrument when executing the second position in the temporal order of the plurality of workflow operation;

(G) determining, via the controller, if the translating (F) satisfies each threshold translation criterion in the plurality of threshold translation criteria; and (H) executing, in accordance with a determination the translating (F) satisfies each threshold translation criterion in the plurality of threshold translation criteria of the determining (G), the second corresponding instance of the compiled workflow, thereby completing the second portion of the manufacture of the plurality of organic engineering targets.

20. A non-transitory computer readable storage medium storing one or more programs, the one or more programs comprising instructions, which when executed by a computer system at a biological foundry, the biological foundry comprising one or more processors, a memory storing one or more programs for execution by the one or more processors, a controller, a communications interface in electrical communication with at least a power supply and a plurality of peripheral devices comprising an articulated handling robot, wherein the articulated handling robot is configured to advance the one or more compiled workflows from one or more instruments in a plurality of instruments, wherein each respective instrument in the plurality of instruments is associated with a corresponding biological foundry operation in a plurality of biological foundry operations, cause the computer system to perform a method comprising:

(A) obtaining, in electronic form, from a remote device, a representation of an uncompiled workflow that is configured to produce a first plurality of organic engineering targets at a plurality of biological foundries, wherein the uncompiled workflow is associated with a predetermined set of a plurality of workflow operations, each workflow operation in the plurality of workflow operations being an operation in the plurality of biological foundry operations and defined by an administrator of the remote device, and wherein the plurality of workflow operations is temporally ordered in accordance with a decision tree defined by the administrator and a plurality of heuristic constraints;

(B) translating, via the controller, using a first set of nodes in a plurality of nodes of the decision tree, for each respective organic engineering target in the first plurality of organic engineering targets, the representation of the uncompiled workflow into a first corresponding instance of a compiled workflow for the respective organic engineering target in accordance with the plurality of heuristic constraints associated with the representation of the uncompiled workflow, wherein the first corresponding instance of the compiled workflow comprises:

(i) for each respective instrument in a subset of instruments of the plurality of instruments:

(a) a corresponding position in the temporal order of the plurality of workflow operations based on the corresponding biological foundry operation associated with the respective instrument, and (b) one or more corresponding execution instructions comprising a corresponding first traverse instruction commanding the articulated handling robot to move to at least one corresponding spatial coordinate associated with the respective instrument;

(C) determining, via the controller, if the translating (B) satisfies each threshold translation criterion in a plurality of threshold translation criteria associated with the translation of the uncompiled workflow, wherein a first threshold translation criterion comprises a performance score based on a comparison of the representation of the uncompiled workflow and the compiled workflow and defined at least in part, by the decision tree;

(D) executing, in accordance with a determination the translating (B) satisfies each threshold translation criterion in the plurality of threshold translation criteria of the determining (C), the first corresponding instance of the compiled workflow, thereby completing a first portion of the manufacture of the plurality of organic engineering targets;

(E) determining, via the controller, if a status of the executing (D) satisfies each threshold execution criterion in a plurality of threshold execution criterion associated with the translation of the uncompiled workflow, wherein a first threshold execution criterion is associated with a disruption associated with a condition at the biological foundry defined by the decision tree;

(F) translating, via the controller, using a second set of nodes, different from the first plurality of nodes, in the plurality of nodes of the decision tree, for each respective organic engineering target in the first plurality of organic engineering targets, the representation of the uncompiled workflow into a second corresponding instance of the compiled workflow for the respective organic engineering target in accordance with the plurality of heuristic constraints associated with the representation of the uncompiled workflow, wherein the second corresponding instance of the compiled workflow comprises:

(i) for a first instrument in the subset of instruments of the plurality of instruments:

(a) a second position other than a first position in the temporal order of the plurality of workflow operation of the first instrument in the first corresponding instance of the compiled workflow, and (b) one or more execution instructions comprising a second traverse instruction commanding the articulated handling robot to move to at least one spatial coordinate associated with the first instrument when executing the second position in the temporal order of the plurality of workflow operation;

(G) determining, via the controller, if the translating (F) satisfies each threshold translation criterion in the plurality of threshold translation criteria; and (H) executing, in accordance with a determination the translating (F) satisfies each threshold translation criterion in the plurality of threshold translation criteria of the determining (G), the second corresponding instance of the compiled workflow, thereby completing the second portion of the manufacture of the plurality of organic engineering targets.

* * * * *